(12) United States Patent
Nakamura

(10) Patent No.: US 7,146,966 B2
(45) Date of Patent: Dec. 12, 2006

(54) CYLINDER CUTOFF CONTROL APPARATUS OF INTERNAL COMBUSTION ENGINE

(75) Inventor: Makoto Nakamura, Kanagawa (JP)

(73) Assignee: Hitachi, Ltd., Chiyoda-Ku (JP)

( * ) Notice: Subject to any disclaimer, the term of this patent is extended or adjusted under 35 U.S.C. 154(b) by 5 days.

(21) Appl. No.: 11/206,098

(22) Filed: Aug. 18, 2005

(65) Prior Publication Data

US 2006/0037578 A1 Feb. 23, 2006

(30) Foreign Application Priority Data

Aug. 20, 2004 (JP) ............................. 2004-240262

(51) Int. Cl.
*F02D 13/06* (2006.01)
*F02D 13/00* (2006.01)

(52) U.S. Cl. .............................. 123/481; 123/198 DB; 123/198 F

(58) Field of Classification Search ............... 123/481, 123/198 DB, 198 F, 90.15, 90.1, 90.11, 90.16, 123/90.17, 90.18
See application file for complete search history.

(56) References Cited

U.S. PATENT DOCUMENTS 5,787,855 A * 8/1998 Mueller et al. .......... 123/198 F 6,978,204 B1 * 12/2005 Surnilla et al. ............. 701/103

FOREIGN PATENT DOCUMENTS

| JP | 10-008935 A | 1/1998 |
|---|---|---|
| JP | 10-082334 A | 3/1998 |
| JP | 2003-172112 A | 6/2003 |
| JP | 2004-156508 A | 6/2004 |

* cited by examiner

*Primary Examiner*—Mahmoud Gimie
(74) *Attorney, Agent, or Firm*—Foley & Lardner LLP

(57) ABSTRACT

A cylinder cutoff control apparatus of an engine initiates a cylinder cutoff mode only when two conditions, namely a low load condition such as a vehicle cruising condition and an intake valve closure timing controlled to a given timing value before a bottom dead center, are both satisfied. A fuel cutoff mode is executed prior to the cylinder cutoff mode. During a transition to the cylinder cutoff mode, the control apparatus holds an intake valve open timing at a given timing value substantially corresponding to a top dead center, simultaneously with reducing an intake valve lift amount of each intake valve, subjected to cylinder cutoff control, to a zero lift. Immediately when the intake valve lift amount is reduced to below a lift threshold value, an exhaust valve lift amount of each exhaust valve, subjected to the cylinder cutoff control, is controlled to a zero lift.

37 Claims, 15 Drawing Sheets

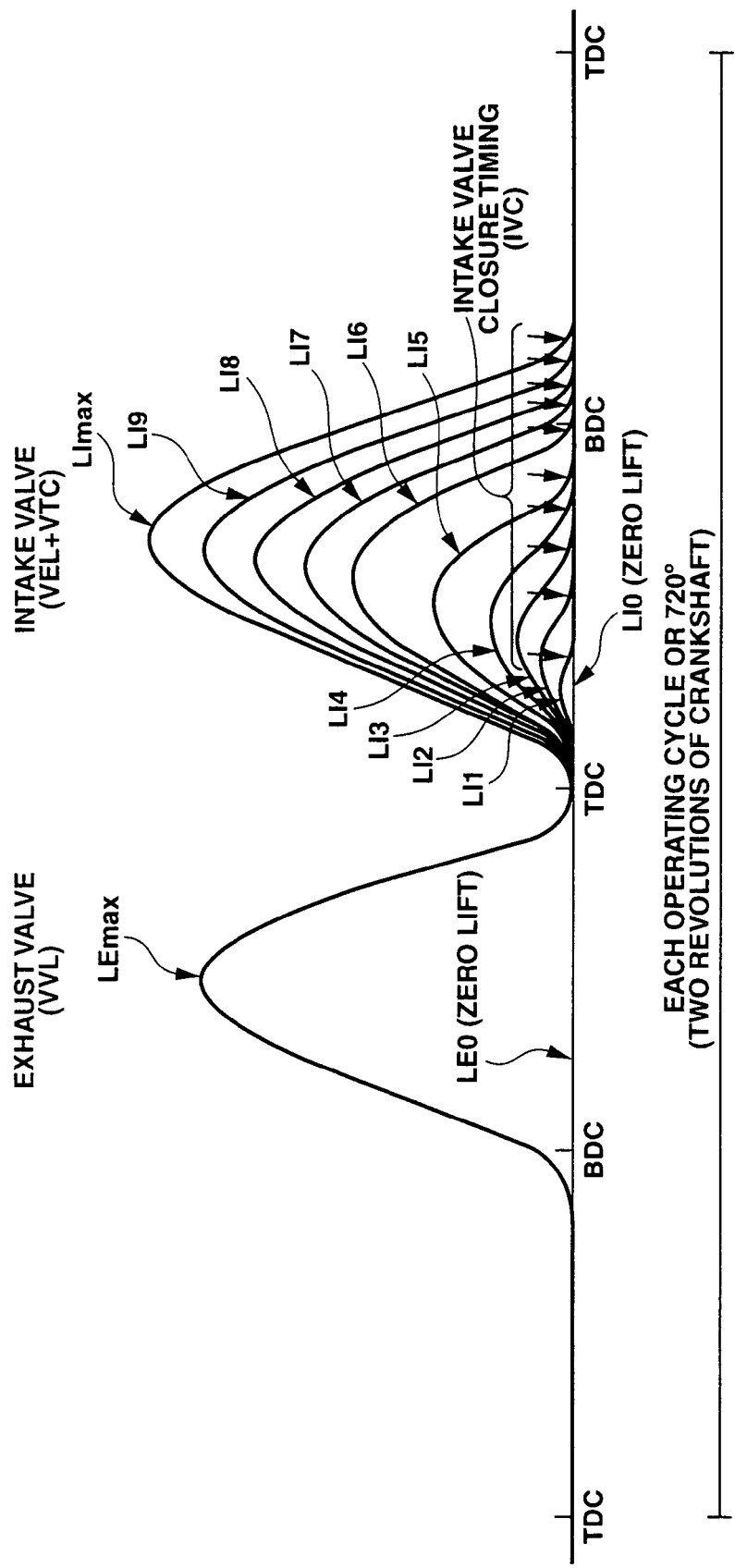

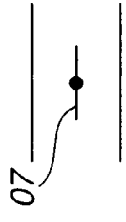
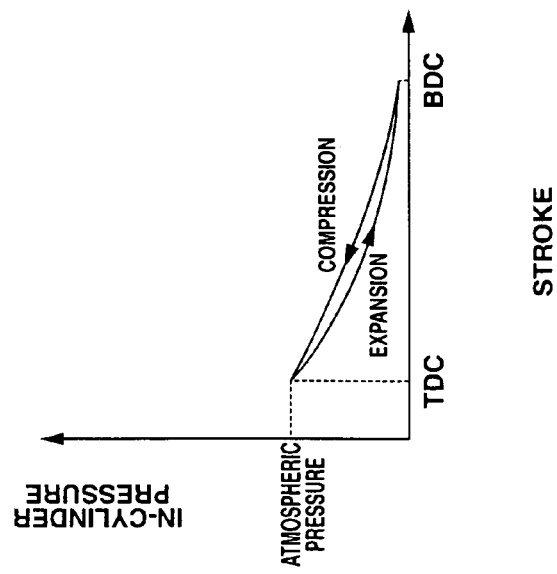
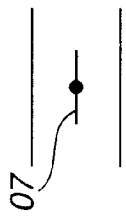
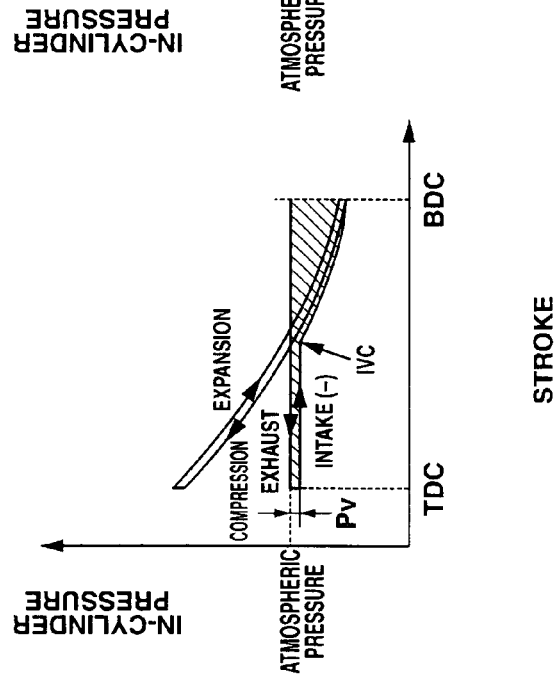
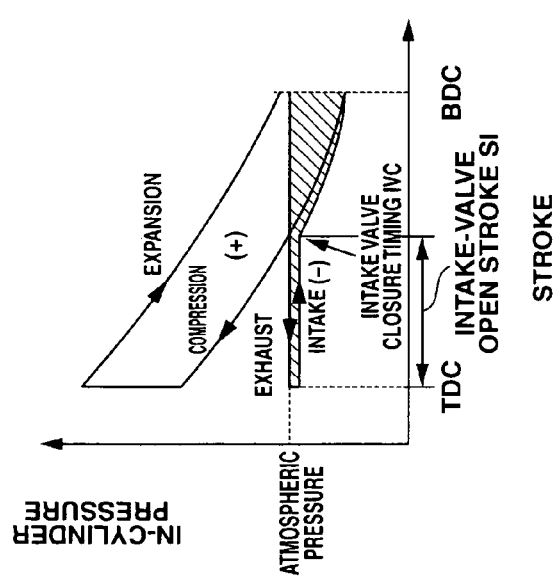

US 7,146,966 B2

CYLINDER CUTOFF CONTROL APPARATUS OF INTERNAL COMBUSTION ENGINE

TECHNICAL FIELD

The present invention relates to an internal-combustion-engine cylinder cutoff control apparatus capable of stopping or cutting off, depending on engine/vehicle operating conditions, a first group of engine cylinders, while a second group of engine cylinders are working, and specifically to the improvement of a technique for electronically controlling mode-switching between (i) a full cylinder operating mode (an all-cylinder operating mode or an all-cylinder active mode) where all of engine cylinders are working and (ii) a partly-inactive cylinder operating mode (a cylinder-in-part operating mode or a cylinder cutoff mode) where the first group of cylinders are inactive and the second group of cylinders are active.

BACKGROUND ART

In recent years, there have been proposed and developed various engine cylinder cutoff control technologies. One such engine cylinder cutoff control device has been disclosed in Japanese Patent Provisional Publication No. 10-82334 (hereinafter is referred to as "JP10-82334"). In the engine cylinder cutoff control device or the engine cylinder resting control device as disclosed in JP10-82334, one of a pair of cylinder cutoff cams (or a pair of cylinder resting cams) is provided at one side of a pair of intake and exhaust valve operating cams, while the other of the cylinder cutoff cam pair is provided at the other side of the intake and exhaust valve operating cams. Each of the cylinder cutoff cams is designed to have only a base circle. An intake-valve rocker arm and a pair of cylinder cutoff rocker arms located on both sides of the intake-valve rocker arm are rockably supported on an intake-valve rocker shaft. Simultaneously, an exhaust-valve rocker arm and a pair of cylinder cutoff rocker arms located on both sides of the exhaust-valve rocker arm are rockably supported on an exhaust-valve rocker shaft. The tips of the two intake-valve cylinder cutoff rocker arms are abutted-engagement with respective intake-valve-stem ends, while the tips of the two exhaust-valve cylinder cutoff rocker arms are abutted-engagement with respective exhaust-valve-stem ends. Also provided is a coupling/uncoupling switching mechanism, comprised of a plurality of plunger pistons, disposed in an interior space of a common cylindrical bore coaxially penetrating the rockably fitted base portion of the intake-valve rocker arm and the rockably fitted base portions of the cylinder cutoff rocker arms. Depending on engine/vehicle operating conditions, the intake-valve rocker arm and the intake-valve cylinder cutoff rocker arms are selectively coupled with each other or uncoupled from each other and simultaneously the exhaust-valve rocker arm and the exhaust-valve cylinder cutoff rocker arms are selectively coupled with each other or uncoupled from each other, by means of the coupling/uncoupling switching mechanism comprised of the plunger pistons, such that the engine operates at either one of the full cylinder operating mode and the partly-inactive cylinder operating mode.

SUMMARY OF THE INVENTION

However, in the engine cylinder cutoff control device as disclosed in JP10-82334, engine cylinder cutoff control (switching between the full cylinder operating mode and the partly-inactive cylinder operating mode) is performed by way of coupling/uncoupling action between a valve-lifting rocker arm (i.e., each of the intake-valve and exhaust-valve rocker arms) and a non-valve-lifting rocker arm (i.e., the cylinder cutoff rocker arms). Therefore, intake-air quantity control for air entering a combustion chamber is achieved by means of a throttle valve located in an intake pipe.

In case of the internal combustion engine employing the earlier cylinder cutoff control device executable intake-air control based on throttle opening control, there are the following drawbacks, which are hereinafter explained by reference to pressure-volume diagrams (P-V diagrams) shown in FIGS. 16A–16C.

As shown in the P-V diagram of FIG. 16A, during a low engine load operation (or in a normal vehicle running state), an internal combustion engine is operated with a throttle valve S held at a comparatively small throttle opening. In the P-V diagram of FIG. 16A, an indicated work of the engine is represented as a difference between a combustion work (a positive work), corresponding to the area indicated by the plus sign (+) in FIG. 16A), and a gas exchange loss (a negative work), corresponding to the area indicated by the minus sign (−) in FIG. 16A). The difference, obtained by subtracting an internal friction loss of the engine from the indicated work, corresponds to a net work generated by the engine.

In the low or light engine load range where engine speed is kept constant or decreasing, there is a tendency for the amount of work generated by the engine to reduce, and thus the combustion work, indicated by the plus sign (+), tends to reduce to a level close to the gas exchange loss, indicated by the minus sign (−). As a result, the major part of combustion work is merely used to compensate for the gas exchange loss, and therefore the combustion work cannot be converted into or used as an effective work. This causes a deterioration in fuel economy, in other words, an increased fuel consumption rate. To avoid the increased fuel consumption rate and to improve the fuel economy at low load operation, it is effective or advantageous to stop or cut off at least one of engine cylinders. That is to say, by virtue of the partly-inactive cylinder operating mode where the first group of cylinders are inactive and the second group of cylinders are active, fresh air is confined in the inactive engine cylinder and thus there is a less gas exchange loss in the inactive cylinder and there is no generation of combustion work of the inactive cylinder. The less gas exchange loss and/or no generation of combustion work means the improved fuel economy (decreased fuel consumption rate). With the inactive cylinder cut off (or resting), only a slight gas exchange loss, corresponding to inflow and outflow of air through a piston-to-cylinder clearance, exists.

In case of the internal combustion engine employing the cylinder cutoff control device capable of switching between the full cylinder operating mode and the partly-inactive cylinder operating mode (the cylinder cutoff mode), when the indicated work is decreasing owing to an engine-load reduction (that is, a decrease in throttle opening of throttle valve S, in other words, an increase in a negative pressure or a vacuum in the intake pipe) during the normal vehicle running state, in a middle of a transition from the normal engine/vehicle operating mode to the cylinder cutoff mode, a fuel cutoff mode (see FIG. 16B) is executed prior to the cylinder cutoff mode (see FIG. 16C). The fuel cutoff mode, executed prior to the cylinder cutoff mode, is effective and advantageous to prevent high-pressure combustion gases from being confined in the inactive cylinder, thereby effectively suppressing or avoiding combustion gases to be produced just before execution of the cylinder cutoff mode. However, in the earlier cylinder cutoff control device, at low load operation, intake air is throttled or decreasingly compensated for by the use of throttle valve S, there is an increased tendency for the gas exchange loss to become great. Therefore, the indicated work of the engine tends to become a large minus value, and whereby an undesirably great engine braking effect is produced. This causes an unnatural feeling that the driver experiences an uncomfortable engine braking shock.

Thereafter, a transition from the fuel cutoff mode (see FIG. 16B) to the cylinder cutoff mode (see FIG. 16C) occurs. As can be seen from two different P-V diagrams (a) and (b) in FIG. 16C, there are two different cases, namely the first case indicated by the P-V diagram (a) and the second case indicated by the P-V diagram (b). The first P-V diagram (a) shown in FIG. 16C corresponds to a case where intake valves included in the first group of cylinders, subjected to cylinder cutoff control, are shifted to their valve shutdown states before shifting exhaust valves included in the first group of cylinders to their valve shutdown states. The second P-V diagram (b) shown in FIG. 16C corresponds to a case where exhaust valves included in the first group of cylinders, subjected to cylinder cutoff control, are shifted to their valve shutdown states before shifting intake valves included in the first group of cylinders to their valve shutdown states. In FIG. 16C, the first P-V characteristic diagram (a) is created during a so-called "intake-valve-advance/exhaust-valve-retard cylinder cutoff mode" (simply, an "intake-valve-advance cylinder cutoff mode"). On the other hand, in FIG. 16C, the second P-V characteristic diagram (b) is created during a so-called "exhaust-valve-advance/intake-valve-retard cylinder cutoff mode" (simply, an "exhaust-valve-advance cylinder cutoff mode"). In both of the intake-valve-advance cylinder cutoff mode and the exhaust-valve-advance cylinder cutoff mode, fresh air is confined in the inactive cylinder, and additionally only two strokes, that is, compression stroke from BDC to TDC and expansion stroke from TDC to BDC are repeatedly executed. Thus, there is a less generation of gas exchange loss in either the intake-valve-advance cylinder cutoff mode (the P-V characteristic diagram (a) in FIG. 16C) or the exhaust-valve-advance cylinder cutoff mode (the P-V characteristic diagram (b) in FIG. 16C).

When the intake-valve-advance cylinder cutoff mode (the P-V characteristic diagram (a) in FIG. 16C) is initiated, exhaust gas is exhausted through the exhaust valves still opened under a condition where the in-cylinder pressure is approximately equal to the atmospheric pressure. After this, the exhaust valves are closed, and then the operating cycle of the inactive cylinder is shifted to an intake stroke. When a shift to the intake stroke occurs, the intake valves have already been kept at their closed states. Thus, a negative pressure (a vacuum) in the inactive cylinder begins to develop due to a downstroke (a downward movement) of the piston, and thereafter the negative pressure becomes a maximum at the bottom dead center (BDC) position at the end of the intake stroke. Thereafter, when an upstroke (an upward movement) of the piston takes place again, the negative pressure in the inactive cylinder begins to reduce again. The in-cylinder pressure returns to almost the atmospheric pressure at the top dead center (TDC) of the piston, that is, at the end of the piston upstroke.

Next, when an expansion stroke occurs, a negative pressure in the inactive cylinder begins to develop owing to a downstroke of the piston in a similar manner to the intake stroke discussed above, and thereafter the negative pressure becomes a maximum at BDC on the expansion stroke. Thereafter, the operating cycle of the inactive cylinder is shifted to an exhaust stroke. When shifting to the exhaust stroke, the exhaust valves as well as the intake valves are kept at their closed states (realizing the cylinder cutoff mode), and thus the negative pressure in the inactive cylinder begins to reduce owing to an upstroke of the piston, and thereafter the in-cylinder pressure in the inactive cylinder returns to almost the atmospheric pressure at TDC.

As set forth above, during the intake-valve-advance cylinder cutoff mode (see the P-V characteristic diagram (a) in FIG. 16C) only the compression and expansion strokes of the piston are repeatedly executed, and thus there is a less generation of gas exchange loss.

In a similar manner to the intake-valve-advance cylinder cutoff mode, in the exhaust-valve-advance cylinder cutoff mode (see the P-V characteristic diagram (b) in FIG. 16C) there is a less generation of gas exchange loss, since only the compression and expansion strokes of the piston are repeatedly executed, as hereunder described.

At the early stage of the exhaust-valve-advance cylinder cutoff mode (the P-V characteristic diagram (b) in FIG. 16C), when exhaust gas has to be exhausted under a condition where the in-cylinder pressure is approximately equal to the atmospheric pressure, the exhaust valves have already been kept closed, and thus the in-cylinder pressure in the inactive cylinder begins to rise up to a positive pressure level higher than the atmospheric pressure owing to an upstroke of the piston. The in-cylinder pressure reaches a peak value at TDC. Thereafter, the in-cylinder pressure begins to reduce owing to a downstroke of the piston, and then returns again to almost the atmospheric pressure at BDC.

As discussed above, in either the intake-valve-advance cylinder cutoff mode (the P-V characteristic diagram (a) in FIG. 16C) or the exhaust-valve-advance cylinder cutoff mode (the P-V characteristic diagram (b) in FIG. 16C) there is a less minus indicated work of the engine, thereby resulting in an undesirably reduced engine braking effect. Only a slight engine braking effect corresponding to an internal friction of the engine exists. Therefore, after a transition from the fuel cutoff mode (see FIG. 16B) to the cylinder cutoff mode (see FIG. 16C), there is an increased tendency for the engine braking effect to be greatly reduced. This means a poor engine braking effect, thus causing an unnatural feeling that the driver experiences an undesirably small engine braking torque.

Accordingly, it is an object of the invention to provide a cylinder cutoff control apparatus of an internal combustion engine capable of effectively suppressing any unnatural feeling that the driver experiences improper engine braking effects such as an uncomfortable engine braking shock or a poor engine braking effect in a transient state from fuel cutoff to cylinder cutoff, and ensuring a better engine braking feel and smooth engine-braking torque reduction even during the fuel-cutoff-to-cylinder-cutoff transition.

In order to accomplish the aforementioned and other objects of the present invention, a cylinder cutoff control apparatus of an internal combustion engine comprises an intake-valve operating control mechanism capable of continuously reducing an intake-valve lift and valve open period characteristic of an intake valve to a zero lift and lifted-period characteristic, an exhaust-valve operating control mechanism capable of reducing an exhaust-valve lift characteristic of an exhaust valve to a zero lift characteristic, an engine-and-vehicle sensor that detects an engine-and-vehicle operating condition, and a control unit configured to be electronically connected to at least the engine-and-vehicle sensor and the valve operating control mechanisms for controlling the valve operating control mechanisms depending on the engine-and-vehicle operating condition, the control unit comprising an intake-air quantity control circuit through which a quantity of intake air is controlled by the intake-valve operating control mechanism, an intake-valve shutdown circuit that generates an intake-valve shutdown signal to the intake-air quantity control circuit, only when two necessary conditions are both satisfied for initiating, based on the engine-and-vehicle operating condition, a cylinder cutoff mode where at least one cylinder is cut off by shifting the intake and exhaust valves to their valve shutoff states, one of the two necessary conditions being a low load condition, and the other being a condition that an intake valve closure timing, varied by the intake-valve operating control mechanism, is controlled to a given timing value before a bottom dead center of a piston, a fuel cutoff circuit that executes a fuel cutoff mode prior to the cylinder cutoff mode, and an exhaust-valve shutdown circuit that reduces the valve lift amount of the exhaust valve to the zero lift by the exhaust-valve operating control mechanism, depending on the valve lift amount of the intake valve.

According to another aspect of the invention, a cylinder cutoff control apparatus of an internal combustion engine comprises an intake-valve operating control mechanism capable of continuously reducing an intake-valve lift and valve open period characteristic of an intake valve to a zero lift and lifted-period characteristic, an exhaust-valve operating control mechanism capable of continuously reducing an exhaust-valve lift and valve open period characteristic of an exhaust valve to a zero lift and lifted-period characteristic, an engine-and-vehicle sensor that detects an engine-and-vehicle operating condition, and a control unit configured to be electronically connected to at least the engine-and-vehicle sensor and the valve operating control mechanisms for controlling the valve operating control mechanisms depending on the engine-and-vehicle operating condition, the control unit comprising a cylinder cutoff circuit that generates control signals to the respective valve operating control mechanisms for reducing the valve lift amount of the exhaust valve substantially in proportion to a reduction in the valve lift amount of the intake valve, when executing, based on the engine-and-vehicle operating condition, a cylinder cutoff mode where at least one cylinder is cut off by shifting the intake and exhaust valves to their valve shutoff states, and a fuel cutoff circuit that initiates a fuel cutoff mode prior to the cylinder cutoff mode.

According to a further aspect of the invention, a cylinder cutoff control apparatus of an internal combustion engine comprises an intake-valve operating control mechanism capable of continuously reducing an intake-valve lift and valve open period characteristic of an intake valve to a zero lift and lifted-period characteristic, an exhaust-valve operating control mechanism capable of continuously reducing an exhaust-valve lift and valve open period characteristic of an exhaust valve to a zero lift and lifted-period characteristic, an engine-and-vehicle sensor that detects an engine-and-vehicle operating condition, and a control unit configured to be electronically connected to at least the engine-and-vehicle sensor and the valve operating control mechanisms for controlling the valve operating control mechanisms depending on the engine-and-vehicle operating condition, the control unit comprising a cylinder cutoff circuit that generates control signals to the respective valve operating control mechanisms for reducing the valve lift amounts of the intake and exhaust valves synchronously with each other, when executing, based on the engine-and-vehicle operating condition, a cylinder cutoff mode where at least one cylinder is cut off by shifting the intake and exhaust valves to their valve shutoff states, and a fuel cutoff circuit that initiates a fuel cutoff mode prior to the cylinder cutoff mode.

According to a still further aspect of the invention, a cylinder cutoff control apparatus of an internal combustion engine comprises an intake-valve operating control mechanism capable of continuously reducing an intake-valve lift and valve open period characteristic of an intake valve to a zero lift and lifted-period characteristic, an exhaust-valve operating control mechanism capable of continuously reducing an exhaust-valve lift and valve open period characteristic of an exhaust valve to a zero lift and lifted-period characteristic, an engine-and-vehicle sensor that detects an engine-and-vehicle operating condition, and a control unit configured to be electronically connected to at least the engine-and-vehicle sensor and the valve operating control mechanisms for controlling the valve operating control mechanisms depending on the engine-and-vehicle operating condition, the control unit comprising a cylinder cutoff circuit that generates control signals to the respective valve operating control mechanisms for preferentially shifting a first one of the intake and exhaust valves to a valve shutdown state immediately when the valve lift amount of the second valve reduces to a predetermined value substantially corresponding to the zero lift, while reducing the valve lift amounts of the intake and exhaust valves synchronously with each other, when executing, based on the engine-and-vehicle operating condition, a cylinder cutoff mode where at least one cylinder is cut off by shifting the intake and exhaust valves to their valve shutoff states, and a fuel cutoff circuit that initiates a fuel cutoff mode prior to the cylinder cutoff mode.

According to another aspect of the invention, a hybrid vehicle employing a parallel hybrid system using both an internal combustion engine and an electric motor as a propelling power source comprises an intake-valve operating control mechanism capable of continuously reducing an intake-valve lift and valve open period characteristic of an intake valve to a zero lift and lifted-period characteristic, an exhaust-valve operating control mechanism capable of reducing an exhaust-valve lift characteristic of an exhaust valve to a zero lift characteristic, an engine-and-vehicle sensor that detects an engine-and-vehicle operating condition, and a control unit configured to be electronically connected to at least the engine-and-vehicle sensor and the valve operating control mechanisms for controlling the valve operating control mechanisms depending on the engine-and-vehicle operating condition, the control unit comprising an intake-air quantity control circuit through which a quantity of intake air is controlled by the intake-valve operating control mechanism, an intake-valve shutdown circuit that generates an intake-valve shutdown signal to the intake-air quantity control circuit, only when two necessary conditions are both satisfied for initiating, based on the engine-and-vehicle operating condition, a cylinder cutoff mode where at least one cylinder is cut off by shifting the intake and exhaust valves to their valve shutoff states, one of the two necessary conditions being a low load condition, and the other being a condition that an intake valve closure timing, varied by the intake-valve operating control mechanism, is controlled to a given timing value before a bottom dead center of a piston, a fuel cutoff circuit that executes a fuel cutoff mode prior to the cylinder cutoff mode, and an exhaust-valve shutdown circuit that reduces the valve lift amount of the exhaust valve to a zero lift by the exhaust-valve operating control mechanism, depending on the valve lift amount of the intake valve.

According to another aspect of the invention, a cylinder cutoff control apparatus of an internal combustion engine comprises an intake-valve operating control mechanism capable of reducing an intake-valve lift and valve open period characteristic of an intake valve to a zero lift and lifted-period characteristic, an exhaust-valve operating control mechanism capable of reducing an exhaust-valve lift and valve open period characteristic of an exhaust valve to a zero lift and lifted-period characteristic, an engine-and-vehicle sensor that detects an engine-and-vehicle operating condition, and a control unit configured to be electronically connected to at least the engine-and-vehicle sensor and the valve operating control mechanisms for controlling the valve operating control mechanisms depending on the engine-and-vehicle operating condition, the control unit comprising a cylinder cutoff circuit that executes, based on the engine-and-vehicle operating condition, a cylinder cutoff mode where a first group of cylinders are cut off by shifting the intake and exhaust valves included in the first group to their valve shutoff states and a second group of cylinders are working, a fuel cutoff circuit that initiates a fuel cutoff mode prior to the cylinder cutoff mode, and an engine-torque compensation circuit that compensates for an engine-braking torque by controlling the valve lift amount of each of the intake valves included in the second group of working cylinders.

According to another aspect of the invention, a cylinder cutoff control apparatus of an internal combustion engine comprises an intake-valve operating control mechanism capable of reducing an intake-valve lift and valve open period characteristic of an intake valve to a zero lift and lifted-period characteristic, an exhaust-valve operating control mechanism capable of reducing an exhaust-valve lift characteristic of an exhaust valve to a zero lift characteristic, an engine-and-vehicle sensor that detects an engine-and-vehicle operating condition, and a control unit configured to be electronically connected to at least the engine-and-vehicle sensor and the valve operating control mechanisms for controlling the valve operating control mechanisms depending on the engine-and-vehicle operating condition, the control unit comprising a cylinder cutoff circuit that executes, based on the engine-and-vehicle operating condition, a cylinder cutoff mode where at least one cylinder is cut off by shifting the intake and exhaust valves to their valve shutoff states, a fuel cutoff circuit that initiates a fuel cutoff mode prior to the cylinder cutoff mode, and a braking-torque compensation circuit that compensates for a fall in engine-braking torque by braking torque application during cylinder cutoff control.

According to another aspect of the invention, a cylinder cutoff control apparatus of an internal combustion engine comprises an intake-valve operating control mechanism capable of reducing an intake-valve lift and valve open period characteristic of an intake valve to a zero lift and lifted-period characteristic, an exhaust-valve operating control mechanism capable of reducing an exhaust-valve lift and valve open period characteristic of an exhaust valve to a zero lift and lifted-period characteristic, an electronically-controlled throttle that adjusts a throttle opening amount, an engine-and-vehicle sensor that detects an engine-and-vehicle operating condition, and a control unit configured to be electronically connected to at least the electronically-controlled throttle, the engine-and-vehicle sensor, and the valve operating control mechanisms for controlling the electronically-controlled throttle and the valve operating control mechanisms depending on the engine-and-vehicle operating condition; the control unit comprising a processor programmed to perform the following, controlling a quantity of intake air by the intake-valve operating control mechanism rather than throttle opening control executed by the electronically-controlled throttle, executing, under a low load condition, a cylinder cutoff mode where at least one cylinder is cut off by shifting the intake and exhaust valves to their valve shutoff states, executing a fuel cutoff mode prior to the cylinder cutoff mode, setting, under the low load condition, an intake valve closure timing of the intake valve to a given timing value before a bottom dead center of a piston by the intake-valve operating control mechanism, and reducing the valve lift amounts of the intake and exhaust valves toward the zero lifts by the valve operating control mechanisms, while keeping the throttle opening amount at a value substantially corresponding to a substantially fully-opened position of the electronically-controlled throttle, during a transition from the fuel cutoff mode to the cylinder cutoff mode.

The other objects and features of this invention will become understood from the following description with reference to the accompanying drawings.

BRIEF DESCRIPTION OF THE DRAWINGS

FIG. 7 is a variable intake-valve lift and timing characteristic diagram, obtained by the intake-valve VEL and VTC mechanisms incorporated in the cylinder cutoff control apparatus of the embodiment, and a variable exhaust-valve lift characteristic diagram, obtained by the exhaust-valve VVL mechanism, incorporated in the cylinder cutoff control apparatus of the embodiment.

FIGS. 8A–8C are P-V diagrams obtained by an internal combustion engine employing the cylinder cutoff control apparatus of the embodiment, and respectively produced in a normal vehicle running state (at low engine load condition), during a fuel cutoff mode, and during a cylinder cutoff mode (or a partly-inactive cylinder operating mode).

DESCRIPTION OF THE PREFERRED EMBODIMENTS

Figure 1:
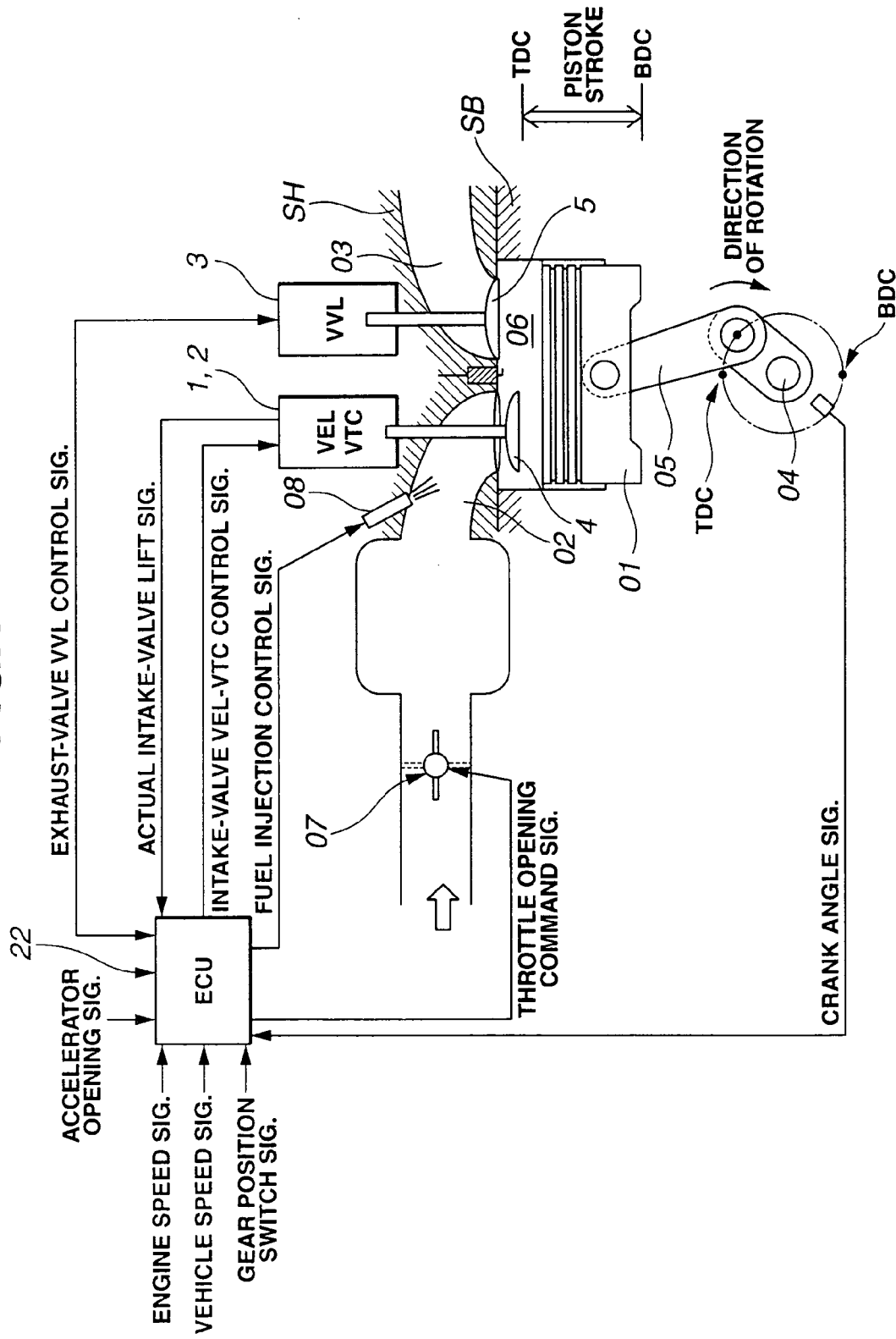
FIG. 1 is a schematic system diagram illustrating an internal combustion engine to which a cylinder cutoff control apparatus of an embodiment can be applied.
Figure 2:
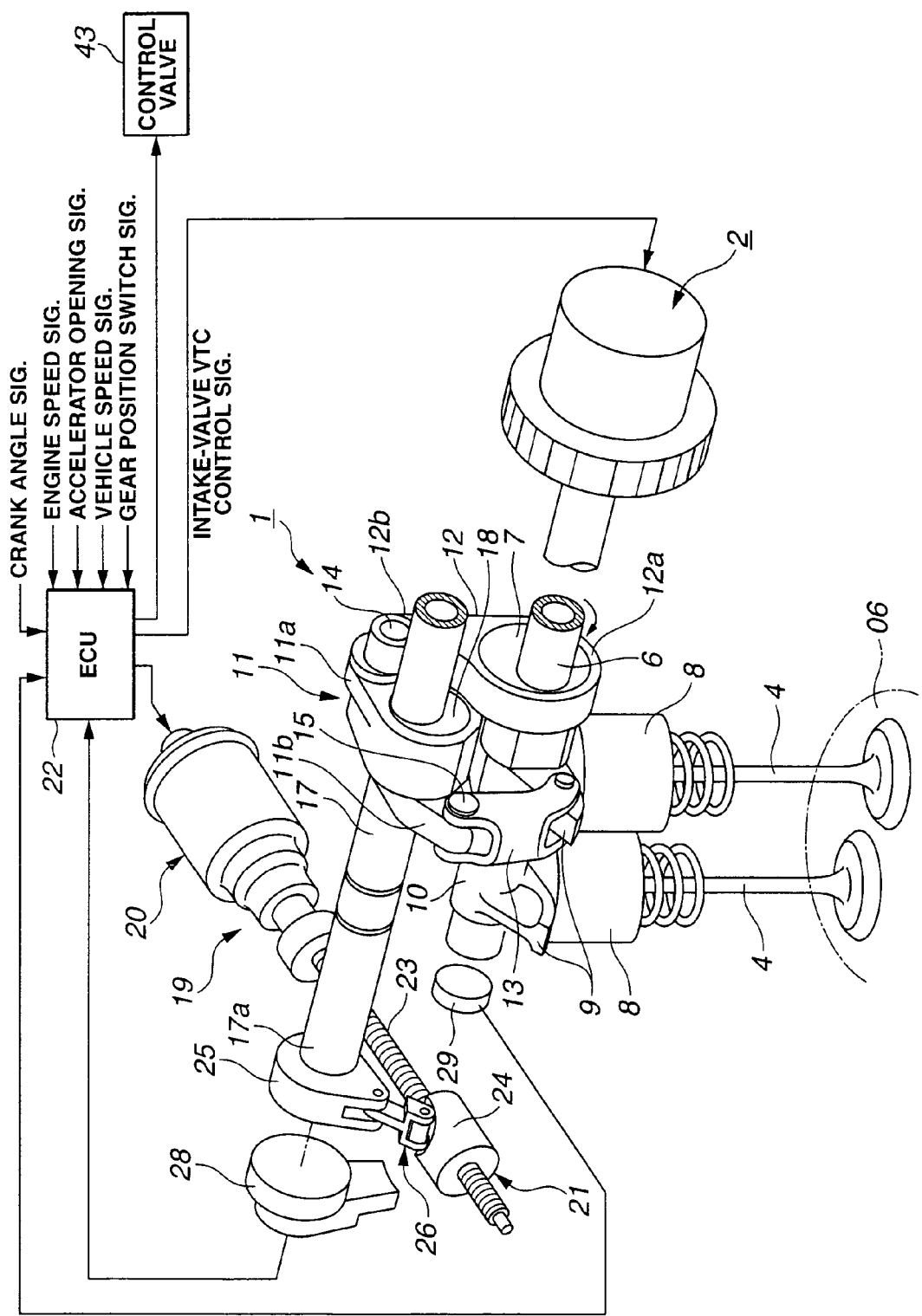
FIG. 2 is a perspective view illustrating an intake-valve operating control mechanism, incorporated in the cylinder cutoff control apparatus of the embodiment, and comprised of a continuously variable intake valve event and lift control (VEL) mechanism and a variable intake valve timing control (VTC) mechanism.
Figure 3:
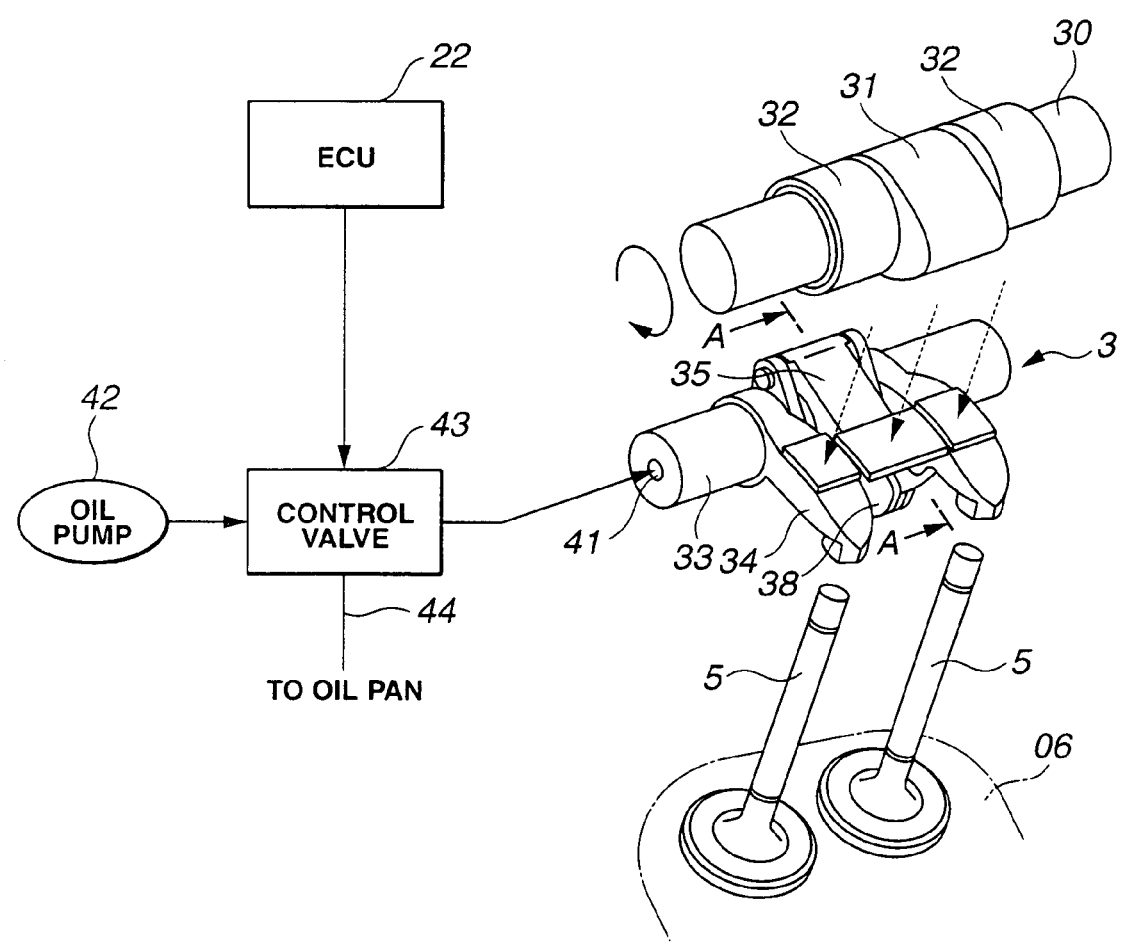
FIG. 3 is a perspective view illustrating an exhaust-valve operating control mechanism, incorporated in the cylinder cutoff control apparatus of the embodiment, and comprised of a variable exhaust valve lift (VVL) mechanism.

Referring now to the drawings, particularly to FIGS. 1–3, the cylinder cutoff control apparatus of the embodiment is exemplified in a valve operating device mounted on a six-cylinder internal combustion engine having four valves per cylinder, namely two intake valves 4, 4 (see FIG. 2) and two exhaust valves 5, 5 (see FIG. 3). As described later, the engine cylinder cutoff apparatus of the embodiment is able to stop or cut off, depending on engine/vehicle operating conditions, a first group of engine cylinders, while a second group of engine cylinders are working.

The construction of the internal combustion engine, to which the cylinder cutoff control apparatus of the embodiment can be applied, is hereunder described in reference to the system diagram of FIG. 1. The engine of FIG. 1 is constructed by a cylinder block SB having a cylinder bore, a reciprocating piston 01 movable or slidable through a stroke in the cylinder bore, a cylinder head SH on the cylinder block SB, an intake port 02 and an exhaust port 03 formed in cylinder head SH, the two intake valves 4, 4 slidably installed on cylinder head SH for opening and closing the opening end of intake port 02, and the two exhaust valves 5, 5 slidably installed on cylinder head SH for opening and closing the opening end of exhaust port 03. Piston 01 is connected to an engine crankshaft 04 via a connecting rod 05. A combustion chamber 06 is defined between the piston crown of piston 01 and the underside of cylinder head SH. An electronically-controlled throttle valve unit 07 is provided upstream of intake port 02 and located in an interior space of an intake pipe connected to intake port 02, for subsidiarily controlling a quantity of intake air for safety purposes and for creating a vacuum existing in the induction system for the purpose of recirculation of blow-by fumes in a blowby-gas recirculation system and/or canister purging in an evaporative emission control system, usually installed on practicable internal combustion engines. Electronically-controlled throttle valve unit 07 is comprised of a round-disk throttle valve, a throttle position sensor, and a throttle actuator that is driven by means of an electric motor such as a step motor. The throttle position sensor is provided to detect the actual throttle opening amount of the throttle valve. The throttle actuator adjusts the throttle opening amount in response to a control command signal from a controller, exactly, an electronic engine control unit (ECU) 22 (described later). A fuel injector (or a fuel injecting valve) 08 is provided downstream of throttle valve unit 07 and located in intake port 02.

As clearly shown in FIGS. 1–3, the valve operating device includes an intake-valve operating control mechanism and an exhaust-valve operating control mechanism. As best seen in FIG. 2, the intake-valve operating control mechanism is comprised of a continuously variable intake valve event and lift control (VEL) mechanism 1 and a variable intake valve timing control (VTC) mechanism (or a phase control mechanism) 2. Intake-valve VEL mechanism 1 is able to continuously control or adjust an intake-valve lift and lifted-period (working angle or valve open period) characteristic for both of intake valves 4, 4 from one of a maximum lift and lifted-period characteristic and a zero lift and lifted-period characteristic to the other. Intake-valve VTC mechanism 2 is able to advance or retard a phase of each of intake valves 4, 4. As best seen in FIG. 3, the exhaust-valve operating control mechanism is comprised of a variable exhaust valve lift (VVL) mechanism 3. Exhaust-valve VVL mechanism 3 is able to switch an exhaust-valve lift characteristic for both of exhaust valves 5, 5 between a maximum lift characteristic and a zero lift characteristic. As the intake-valve VEL mechanism 1, the apparatus of the embodiment uses a VEL mechanism as disclosed in Japanese Patent Provisional Publication No. 2003-172112. Briefly speaking, as shown in FIG. 2, intake-valve VEL mechanism 1 is comprised of a cylindrical hollow drive shaft 6, a ring-shaped drive cam 7, two rockable cams 9, 9, and a multinodular-link motion transmitting mechanism (or a motion converter) mechanically linked between drive cam 7 and the rockable-cam pair (9, 9) for transmitting a torque created by drive cam (eccentric cam) 7 as an oscillating force of each of rockable cams 9, 9. Cylindrical hollow drive shaft 6 is rotatably supported by bearings in the upper part of cylinder head SH. Drive cam 7 is formed as an eccentric cam that is press-fitted onto the outer periphery of drive shaft 6. Rockable cams 9, 9 are oscillatingly or rockably supported on the outer periphery of drive shaft 6 and in sliding-contact with respective upper contact surfaces of two valve lifters 8, 8, which are located at the valve stem ends of intake valves 4, 4. In other words, the motion transmitting mechanism (or the motion converter) is provided to convert a rotary motion (input torque) of drive cam 7 into an up-and-down motion (a valve opening force) of each intake valve 4 (i.e., an oscillating force creating an oscillating motion of each rockable cam 9).

Torque is transmitted from engine crankshaft 04 to drive shaft 6. As indicated by the arrow in FIG. 2, the direction of rotation of drive shaft 6 is set in a clockwise direction.

Drive cam 7 has an axial bore that is displaced from the geometric center of the cylindrical drive cam 7. Drive cam 7 is fixedly connected to the outer periphery of drive shaft 6, so that the inner peripheral surface of the axial bore of drive cam 7 is press-fitted onto the outer periphery of drive shaft 6. Thus, the center of drive cam 7 is offset from the shaft center of drive shaft 6 in the radial direction by a predetermined eccentricity (or a predetermined offset value).

As best seen from the axial rear views shown in FIGS. 4A–4B, and 5A–5B, each of rockable cams 9, 9 is formed as a substantially raindrop-shaped cam. Rockable cams 9, 9 have the same cam profile. Rockable cams 9, 9 are formed integral with respective axial ends of a cylindrical-hollow camshaft 10. Cylindrical-hollow camshaft 10 is rotatably supported on drive shaft 6. The outer peripheral contacting surface of rockable cam 9, in sliding-contact with the upper contact surface of valve lifter 8, includes a cam surface 9a. The base-circle portion of rockable cam 9 is integrally formed with or integrally connected to camshaft 10, to permit oscillating motion of rockable cam 9 on the axis of drive shaft 6. The outer peripheral surface (cam surface 9a) of rockable cam 9 is constructed by a base-circle surface, a circular-arc shaped ramp surface extending from the base-circle surface to a cam-nose portion, a top-circle surface (simply, a top surface) that provides a maximum valve lift (or a maximum lift amount), and a lift surface by which the ramp surface and the top surface are joined. The base-circle surface, the ramp surface, the lift surface, and the top surface abut predetermined positions of the upper surface of valve lifter 8, depending on the oscillatory position of rockable cam 9.

The motion transmitting mechanism (the motion converter) is comprised of a rocker arm 11 laid out above drive shaft 6, a link arm 12 mechanically linking one end (or a first armed portion 11a) of rocker arm 11 to drive cam 7, and a link rod 13 mechanically linking the other end (a second armed portion 11b) of rocker arm 11 to the cam-nose portion of rockable cam 9.

Rocker arm 11 is formed with an axially-extending center bore (a through opening). The rocker-arm center bore of rocker arm 11 is rotatably fitted onto the outer periphery of a control cam 18 (described later), to cause a pivotal motion (or an oscillating motion) of rocker arm 11 on the axis of control cam 18. The first armed portion 11a of rocker arm 11 extends from the axial center bore portion in a first radial direction, whereas the second armed portion 11b of rocker arm 11 extends from the axial center bore portion in a second radial direction substantially opposite to the first radial direction. The first armed portion 11a of rocker arm 11 is rotatably pin-connected to link arm 12 by means of a connecting pin 14, while the second armed portion 11b of rocker arm 11 is rotatably pin-connected to one end (a first end 13a) of link rod 13 by means of a connecting pin 15.

Link arm 12 is comprised of a comparatively large-diameter annular base portion 12a and a comparatively small-diameter protruding end portion 12b radially outwardly extending from a predetermined portion of the outer periphery of large-diameter annular base portion 12a. Large-diameter annular base portion 12a is formed with a drive-cam retaining bore, which is rotatably fitted onto the outer periphery of drive cam 7. On the other hand, small-diameter protruding end portion 12b of link arm 12 is pin-connected to the first armed portion 11a of rocker arm 11 by means of connecting pin 14.

Link rod 13 is pin-connected at the other end (a second end 13b) to the cam-nose portion of rockable cam 9 by means of a connecting pin 16.

Also provided is a motion-converter attitude control mechanism that changes an initial actuated position of the motion transmitting mechanism (or the motion converter). As clearly shown in FIGS. 4A–4B and 5A–5B, the attitude control mechanism includes a control shaft 17 and control cam 18. Control shaft 17 is located above and arranged in parallel with drive shaft 6 in such a manner as to extend in the longitudinal direction of the engine, and rotatably supported on cylinder head SH by means of the same bearing members as drive shaft 6. Control cam 18 is attached to the outer periphery of control shaft 17 and slidably fitted into and oscillatingly supported in a control-cam retaining bore formed in rocker arm 11. Control cam 18 serves as a fulcrum of oscillating motion of rocker arm 11. Control cam 18 is integrally formed with control shaft 17, so that control cam 18 is fixed onto the outer periphery of control shaft 17. Control cam 18 is formed as an eccentric cam having a cylindrical cam profile. The axis of (the geometric center) of control cam 18 is displaced a predetermined distance from the axis of control shaft 17.

As shown in FIG. 2, the attitude control mechanism also includes a drive mechanism 19. Drive mechanism 19 is comprised of a geared motor or an electric control-shaft actuator 20 fixed to one end of a housing (not shown) and a ball-screw motion-transmitting mechanism (simply, a ball-screw mechanism) 21 that transmits a motor torque created by motor 20 to control shaft 17. In more detail, motor 20 is constructed by a proportional control type direct-current (DC) motor. Motor 20 is controlled in response to a control signal, which is generated from the intake-air quantity control circuit of ECU 22 and whose signal value is determined based on engine/vehicle operating conditions. Ball-screw mechanism 21 is comprised of a ball-screw shaft (or a worm shaft) 23 coaxially aligned with and connected to the motor output shaft of motor 20, a substantially cylindrical, movable ball nut 24 threadably engaged with the outer periphery of ball-screw shaft 23, a link arm 25 fixedly connected to the rear end 17a of control shaft 17, a link member 26 mechanically linking link arm 25 to ball nut 24, and recirculating balls interposed between the worm teeth of ball-screw shaft 23 and grooves cut in the inner peripheral wall surface of ball nut 24. In a conventional manner, a rotary motion (input torque) of ball-screw shaft 23 is converted into a rectilinear motion of ball nut 24.

As shown in FIGS. 1–2, the controller (ECU) 22 comprises a microcomputer. ECU 22 includes an input/output interface (I/O), memories (RAM, ROM), and a microprocessor or a central processing unit (CPU). The input/output interface (I/O) of ECU 22 receives input information from various engine/vehicle switches and sensors, namely a crank angle sensor, an engine speed sensor, an accelerator opening sensor, a vehicle speed sensor, a range gear position switch, a control-shaft angular position sensor 28, and a drive-shaft angular position sensor 29. Control-shaft angular position sensor 28 is provided to detect an angular position of control shaft 17, whereas drive-shaft angular position sensor 29 is provided to detect an angular position of drive shaft 6. Within ECU 22, the central processing unit (CPU) allows the access by the I/O interface of input informational data signals from the previously-discussed engine/vehicle switches and sensors. The CPU of ECU 22 is responsible for carrying the control program stored in memories and is capable of performing necessary arithmetic and logic operations containing the intake-air quantity control processing, the cylinder cutoff control processing (containing fuel cutoff operation achieved by an electronic fuel-injection system, intake-valve shutdown operation achieved by the intake-valve VEL mechanism, and exhaust-valve shutdown operation achieved by the exhaust-valve VVL mechanism (or an exhaust-valve VEL mechanism (described later)), in addition to electronic throttle opening control achieved through the throttle actuator of electronically-controlled throttle valve unit 07, and electronic fuel injection control achieved by the electronic fuel-injection system. Computational results (arithmetic calculation results), that is, calculated output signals are relayed through the output interface circuitry of ECU 22 to output stages, namely the throttle actuator of throttle valve unit 07, electronically-controlled fuel injectors of the fuel-injection system, motor 20 of the intake-valve VEL mechanism, the intake-valve VTC mechanism, and an electromagnetic directional control valve 43 (described later) of the exhaust-valve VVL mechanism.

More concretely, the processor of ECU 22 incorporated in the cylinder cutoff control apparatus of the embodiment also includes an intake-air quantity control circuit, a fuel cutoff circuit, an intake-valve shutdown circuit, and an exhaust-valve shutdown circuit. The intake-air quantity control circuit operates to control the quantity of intake air mainly by means of intake-valve VEL mechanism 1, rather than using electronically-controlled throttle valve unit 07. When initiating, based on the engine/vehicle operating condition, the partly-inactive cylinder operating mode (the cylinder cutoff mode), the intake-valve shutdown circuit generates an intake-valve shutdown signal, responsively to which signal each of intake valves 4, 4 is shifted to a valve shutdown state (or a valve fully-closed state), to the intake-air quantity control circuit, only when two necessary conditions are satisfied before switching from a full cylinder operating mode where all of engine cylinders are working to the cylinder cutoff mode. The first necessary condition (related to step S2 of the cylinder cutoff control routine shown in FIG. 9 described later) is a low engine load condition where engine speed is kept constant or decreasing. The second necessary condition (related to step S4 of the cylinder cutoff control routine shown in FIG. 9 described later) is a condition that the intake valve closure timing (IVC) of each of intake valves 4, 4, which can be adjusted or varied by means of intake-valve VEL mechanism 1, is controlled to a given timing value before BDC. The fuel cutoff circuit initiates a fuel cutoff mode prior to the cylinder cutoff mode initiated by the intake-valve shutdown circuit. The exhaust-valve shutdown circuit reduces an exhaust-valve lift (an actual exhaust-valve lift amount) of each of exhaust valves 5, 5 to a zero lift by means of exhaust-valve VVL mechanism 3, depending on an intake-valve lift (an actual intake-valve lift amount) LI of each of intake valves 4, 4, exactly, depending on whether actual intake-valve lift LI of intake valve 4 is less than a predetermined lift threshold value LS.

Figure 4A:
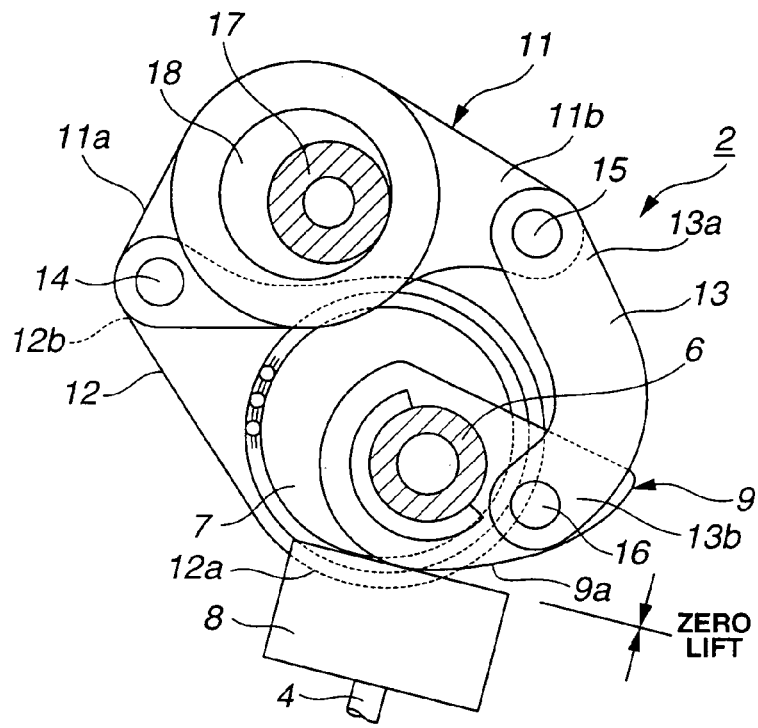
FIGS. 4A–4B are axial rear views showing the operation of the intake-valve VEL mechanism during a zero-lift control mode.
Figure 4B:
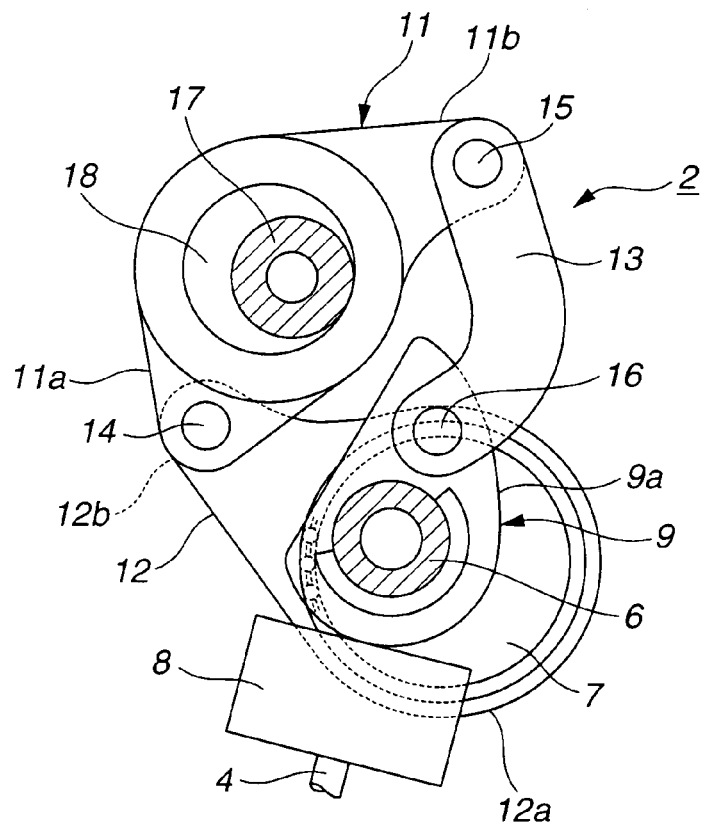

Hereunder described briefly in reference to FIGS. 2, 4A–4B, 5A–5B, and 7 is the operation of intake-valve VEL mechanism 1. In a low load range, such as during cruising of the vehicle at low engine load operation or during vehicle coasting at low engine load operation, motor 20 of intake-valve VEL mechanism 1 is driven in response to a control signal generated from the output interface of ECU 22 and determined based on the low engine load condition. Thus, ball-screw shaft 23 is rotated by input torque created by motor 20, thereby producing a maximum rectilinear motion of ball nut 24 in one ball-nut axial direction. As a result, control shaft 17 rotates in one rotational direction via a linkage comprised of link member 26 and link arm 25. As can be seen from the angular position of control cam 18 shown in FIGS. 4A–4B, by way of revolving motion of the center of control cam 18 around the center of control shaft 17, the radially thick-walled portion of control cam 18 shifts upwards apart from drive shaft 6 and is held at the upwardly shifted position, with the result that the pivot (the connected point by connecting pin 15) between the second armed portion 11b of rocker arm 11 and the first rod end 13a of link rod 13 also shifts upwards with respect to drive shaft 6. As a result, the cam-nose portion of each of rockable cams 9, 9 is forcibly pulled up via the second rod end 13b of link rod 13. As viewed from the rear end of drive shaft 6, the angular position of each rockable cam 9 shown in FIGS. 4A–4B is relatively shifted to the counterclockwise direction from the angular position of each of rockable cam 9 shown in FIGS. 5A–5B. With control cam 18 held at the angular position shown in FIGS. 4A–4B, when drive cam 7 is rotated, a rotary motion of drive cam 7 is converted through link arm 12, the first armed portion 11a of rocker arm 11, the second armed portion 11b of rocker arm 11, and link rod 13 into an oscillating motion of rockable cam 9, but only the base-circle surface area of rockable cam 9 is brought into sliding-contact with the upper contact surface of valve lifter 8 (see FIGS. 4A–4B). Thus, the actual intake-valve lift becomes a zero lift LI0 (see the intake-valve zero lift LI0 characteristic shown in FIG. 7). As a result of this, intake valves 4 included in the first group of cylinders, subjected to cylinder cutoff control (or the partly-inactive cylinder operating mode), become shifted to their intake-valve shutdown states.

Figure 5A:
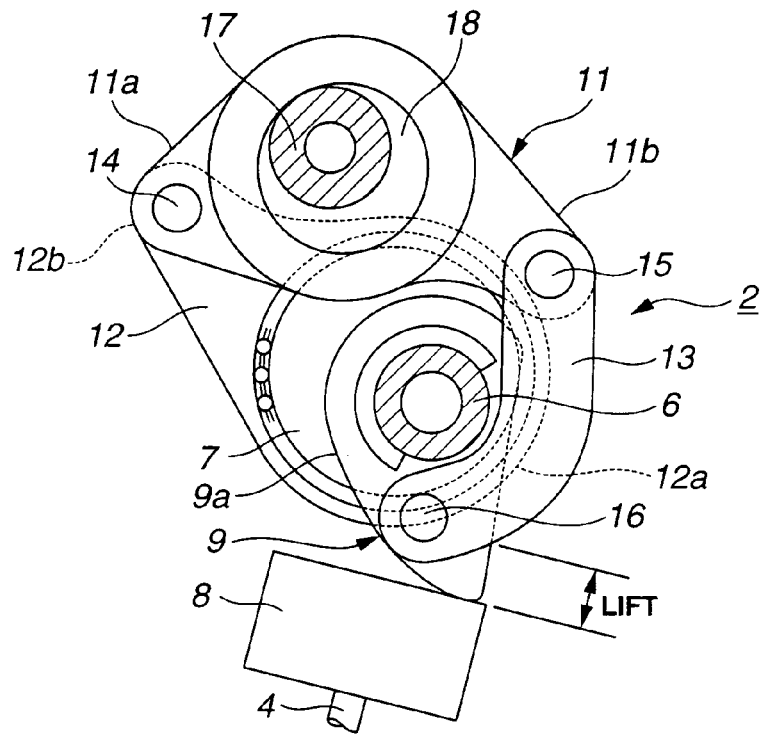
FIGS. 5A–5B are axial rear views showing the operation of the intake-valve VEL mechanism during a maximum-lift control mode.
Figure 5B:
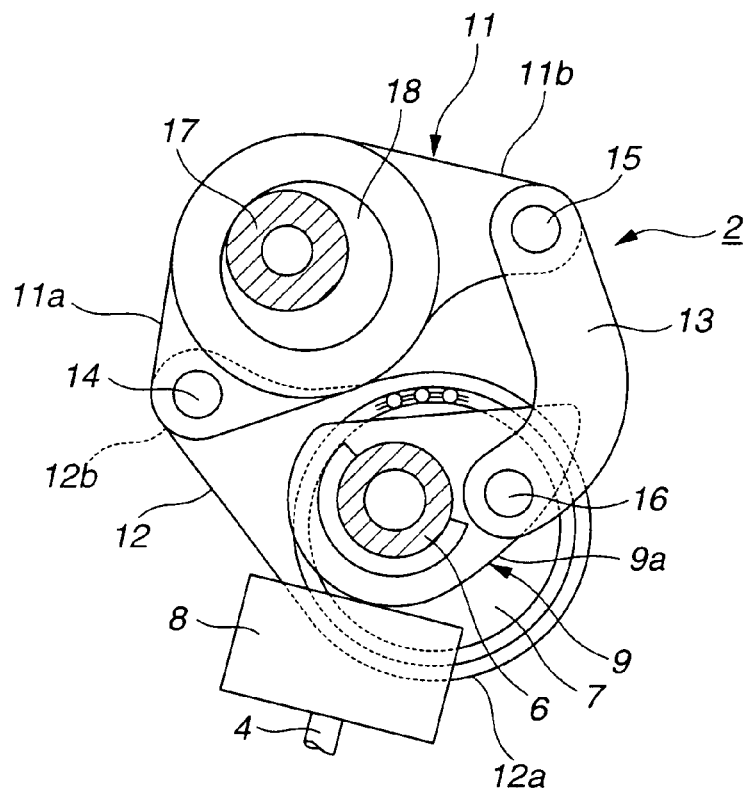

Conversely, when the engine/vehicle operating condition is shifted from a low load range to a high load range, motor 20 is driven in the reverse-rotational direction responsively to a control signal, which is generated from the output interface of ECU 22 and determined based on the high engine load condition. Thus, ball-screw shaft 23 is also rotated in the reverse-rotational direction by reverse-rotation of the motor output shaft of motor 20, thereby producing the opposite rectilinear motion of ball nut 24. As a result, control shaft 17 rotates in the opposite rotation direction via the linkage (25, 26). As can be seen from the angular position of control cam 18 shown in FIGS. 5A–5B, by way of revolving motion of the center of control cam 18 around the center of control shaft 17, the radially thick-walled portion of control cam 18 downwardly shifts toward drive shaft 6 and is held at the downwardly shifted position, with the result that the pivot (the connected point by connecting pin 15) between the second armed portion 11b of rocker arm 11 and the first rod end 13a of link rod 13 also shifts downwards with respect to drive shaft 6. As a result, the cam-nose portion of each of rockable cams 9, 9 is forcibly pushed down via the second rod end 13b of link rod 13. As viewed from the rear end of drive shaft 6, the angular position of each rockable cam 9 shown in FIGS. 5A–5B is relatively shifted to the clockwise direction from the angular position of each of rockable cam 9 shown in FIGS. 4A–4B. With control cam 18 shifted from the angular position shown in FIGS. 4A–4B to the angular position shown in FIGS. 5A–5B, during rotation of drive cam 7, a rotary motion of drive cam 7 is converted through link arm 12, the first armed portion 11a of rocker arm 11, the second armed portion 11b of rocker arm 11, and link rod 13 into an oscillating motion of rockable cam 9. At this time, a part of the base-circle surface area, the ramp surface area, the lift surface area, and the top surface area are brought into sliding-contact with the upper contact surface of valve lifter 8 (see FIGS. 5A–5B). Thus, when varying from the angular position of control cam 18 shown in FIGS. 4A–4B to the angular position of control cam 18 shown in FIGS. 5A–5B, the actual intake-valve lift can be quickly varied from the zero lift LI0 to a maximum intake-valve lift LImax (see a continuous change from the intake-valve zero lift LI0 characteristic to the intake-valve maximum lift LImax characteristic of FIG. 7). As can be appreciated from a plurality of intake-valve lift characteristic curves (exactly, a plurality of intake-valve lift and lifted-period characteristic curves) shown in FIG. 7, according to the intake-valve VEL mechanism 1 of the cylinder cutoff apparatus of the embodiment, through all engine operating conditions from a low engine load condition to a high engine load condition, the intake-valve lift and lifted-period characteristic can be continuously controlled or adjusted from the intake-valve zero lift and lifted-period LI0 characteristic through intermediate lift and lifted-period characteristics LI1, LI2, ..., LI9 to the intake-valve maximum lift and lifted-period LImax characteristic. That is to say, the intake-valve lift and lifted-period characteristic can be controlled or adjusted to an optimal characteristic suited to the latest up-to-date information concerning engine operating condition, in particular, engine load. In the intake-valve lift and lifted period characteristic curves shown in FIG. 7, intake valve closure timing IVC is defined as an instantaneous timing value that a contacting point between rockable cam 9 and valve lifter 8 shifts from the lift surface to the ramp surface. That is, as indicated by the arrows in FIG. 7, intake valve closure timing IVC corresponds to a joined portion between the lift surface zone and the down-sloped ramp surface zone featuring constant velocity in valve movement. This is because the joined portion between the lift surface zone and the down-sloped ramp surface zone represents a substantial, effective intake-valve closure timing value rather than the actual timing at which each of intake valves 4, 4 begins to actually close. In a similar manner to intake valve closure timing IVC, the intake valve open timing (IVO) of intake valve 4 corresponds to a joined portion between the up-sloped ramp surface zone and the down-sloped ramp surface zone. The valve open period of intake valve 4 corresponds to a time period between intake valve closure timing IVC and intake valve open timing IVO. Instead of defining intake valve closure timing IVC as the joined portion between the lift surface zone and the down-sloped ramp surface zone, and instead of defining intake valve open timing IVO as the joined portion between the up-sloped ramp surface zone and the down-sloped ramp surface zone, the intake valve closure timing IVC may be defined as a timing value at which intake valve 4 begins to close, and the intake valve open timing IVO may be defined as a timing value at which intake valve 4 begins to open. For the two different definitions, there is a less difference in valve-movement adjusting effect.

In the apparatus of the embodiment, basically, it is possible to control the intake-air quantity, in other words, a required quantity of air entering combustion chamber 06, by variably controlling the intake-valve lift and lifted-period characteristic of intake valve 4 mainly by means of intake-valve VEL mechanism 1, rather than using the throttle valve of electronically-controlled throttle valve unit 07. Thus, the throttle opening of electronically-controlled throttle valve unit 07 is usually held at or controlled to a predetermined constant value substantially corresponding to a substantially unthrottled position (or a substantially full-open position or a full-throttle position) at which a predetermined negative pressure in a collector of the induction system can be produced. The predetermined negative pressure in the collector is set to a predetermined minimum negative pressure of a negative pressure source. Fixing the throttle opening to the predetermined constant value (the predetermined collector pressure) substantially corresponding to the substantially unthrottled position means an almost unthrottled condition. This greatly reduces an engine pumping loss. As previously described, the predetermined minimum negative pressure (i.e., the predetermined vacuum) can be effectively used for recirculation of blow-by fumes in a blowby-gas recirculation system and/or canister purging in an evaporative emission control system, usually installed on practicable internal combustion engines. As set out above, as a basic way to control the intake-air quantity, continuously variable intake valve event and lift control (continuous VEL control) is utilized. However, in an excessively low-speed and excessively low-load range in which the quantity of intake air is excessively small, the intake valve lift must be finely controlled or adjusted to a very small lift. As a matter of course, such a fine adjustment of the intake valve lift to the very small lift is very difficult, and thus there is a possibility of a slight deviation of the actual intake-valve lift from the desired valve lift (the very small lift). In other words, there is an increased tendency for a remarkable error in the intake-air quantity of each engine cylinder, that is, a remarkable error in an air/fuel (A/F) mixture ratio to occur by way of the use of the intake-valve VEL control in the excessively low-speed and excessively low-load range. To avoid this, and for safety purposes, in the excessively low-speed and excessively low-load range, the intake-valve lift and lifted-period characteristic is fixed constant, while the throttle control is initiated by means of electronically-controlled throttle valve unit 07 so as to produce a desired intake-air quantity suited to such an excessively low-speed and excessively low-load operation.

As the intake-valve VTC mechanism 2, the apparatus of the shown embodiment uses a hysteresis-brake equipped VTC mechanism as disclosed in Japanese Patent Provisional Publication No. 2004-156508. Briefly speaking, a relative phase-angle variator (a relative phase varying means) is provided between a drive ring (a substantially cylindrical-hollow timing sprocket member) driven by the crankshaft and a driven member fixedly connected to the front end of drive shaft 6, for varying an angular phase of drive shaft 6 (the driven member) relative to the drive ring (the timing sprocket). The operation of the hysteresis brake of the VTC mechanism is controlled in response to a control current, which is generated from ECU 22 and whose current value is properly adjusted or regulated depending on the latest up-to-date information about an engine/vehicle operating condition, such that a phase of intake valve 4, which is represented in terms of a crankangle, is properly controlled (phase-advanced or phase-retarded). Instead of using the hysteresis-brake equipped VTC mechanism, a hydraulically-operated VTC mechanism may be used. In the apparatus of the embodiment, the variable phase control achieved by intake-valve VTC mechanism 2 is combined with the continuous VEL control achieved by intake-valve VEL mechanism 1, such that intake valve closure timing IVC of intake valve 4 is controlled to or brought closer to substantially 90 degrees of crankangle before the B.D.C. position of piston 01. Therefore, a piston stroke S of piston 01, obtained during the intake-valve open period, tends to be shortened in comparison with a usual piston stroke obtained during a standard intake-valve open period. The piston stroke S, obtained during the intake-valve open period, will be hereinafter is referred to as "intake-valve open stroke SI".

Figure 6A:
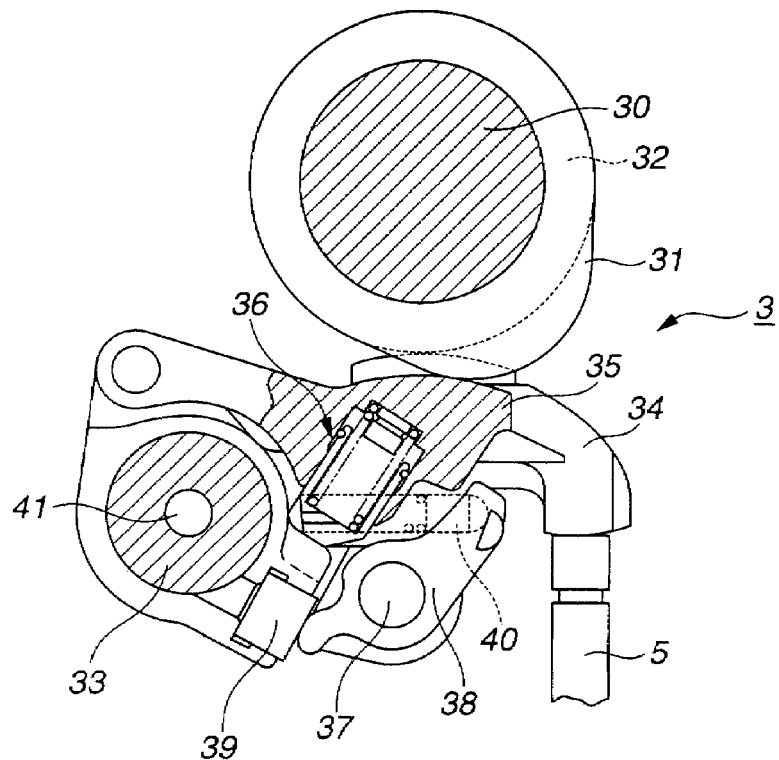
FIG. 6A is an explanatory view showing the operation of the exhaust-valve VVL mechanism during a zero-lift control mode, as viewed from the axial direction.
Figure 6B:
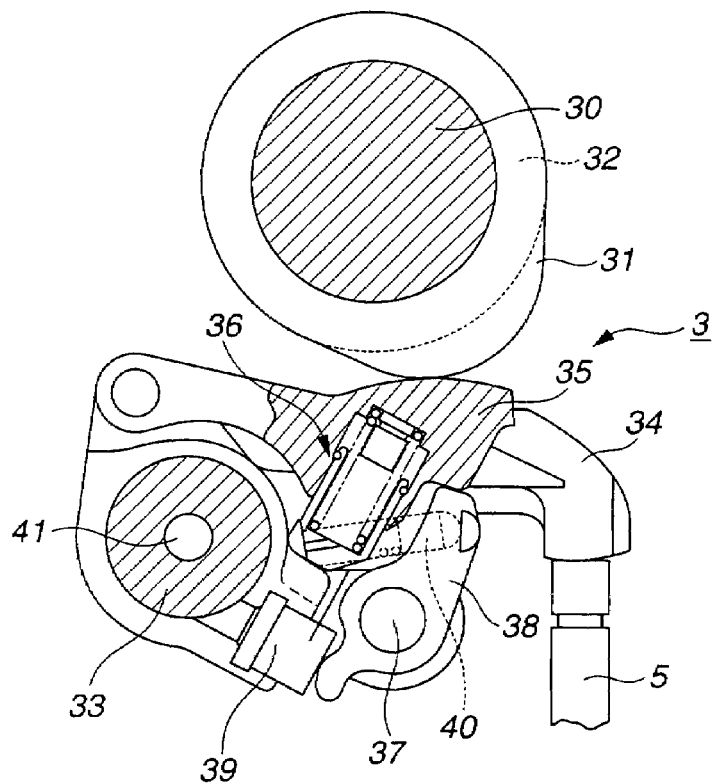
FIG. 6B is an explanatory view showing the operation of the exhaust-valve VVL mechanism during a maximum-lift control mode, as viewed from the axial direction.

As the exhaust-valve VVL mechanism 3, the apparatus of the shown embodiment uses a VVL mechanism as disclosed in Japanese Patent Provisional Publication No. 10-8935. Briefly speaking, as shown in FIGS. 3 and 6A–6B, exhaust-valve VVL mechanism 3 is comprised of a high-speed cam 31, a pair of cylindrical zero-lift cams (or low-speed cams) 32, 32, a rocker shaft 33, a main rocker arm (or a low-speed rocker arm or a first driving member) 34, a sub rocker arm (or a high-speed rocker arm or a second driving member) 35, a lost motion mechanism 36, a pin or a pivot 37, a lever member 38 pivotally supported by pivot 37, a hydraulically-operated plunger 39, and a return spring 40. An exhaust-valve camshaft 30 has the high-speed cam 31 formed as integral section of the exhaust-valve camshaft. There is one high-speed cam 31 for each engine cylinder. One of zero-lift cams 32, 32 is provided at one side of high-speed cam 31, while the other of zero-lift cams 32, 32 is provided at the other side of high-speed cam 31. High-speed cam 31, and zero-lift cams 32, 32 are fixed to exhaust-valve camshaft 30 for co-rotation with the exhaust-valve camshaft. Main rocker arm 34 is oscillatingly or rockably supported on rocker shaft 33. High-speed cam 31 has a cam stroke higher than zero-lift cam 32. Main rocker arm (low-speed rocker arm) 34 has a pair of armed portions, whose tips are abutted-engagement with the respective valve stem ends of exhaust valves 5, 5. The armed portions of main rocker arm 34 are located at positions corresponding to the respective zero-lift cams 32, 32. Sub rocker arm (high-speed rocker arm) 35 is provided between the armed portions of main rocker arm 34, in such a manner as to be located at a position corresponding to high-speed cam 31. If needed (depending on an engine/vehicle operating condition), sub rocker arm (high-speed rocker arm) 35 can be operated in a lost-motion operating mode. As clearly shown in FIGS. 6–6B, lost motion mechanism 36 is provided in the lower portion of sub rocker arm 35 to enable a lost motion function of sub rocker arm 35. Lever member 38 is oscillatingly or rockably supported on pivot 37 fixedly connected to main rocker arm 34. Depending on an engine/vehicle operating condition, a first radially-outward extending end of lever member 38 is engaged with or disengaged from the lower end portion of sub rocker arm 35 to couple sub rocker arm 35 with main rocker arm 34 for synchronous motion between sub rocker arm 35 and main rocker arm 34 or to uncouple sub rocker arm 35 from main rocker arm 34 for realizing the lost motion function of sub rocker arm 35. Hydraulically-operated plunger 39 is linked to a second radially-outward extending end of lever member 38 for bringing the first end of lever member 38 into and out of engagement with the lower end portion of sub rocker arm 35. Return spring 40 permanently forces the first end of lever member 38 out of engagement with sub rocker arm 35. Pivot 37, lever member 38, hydraulically-operated plunger 39, and return spring 40 construct a coupling mechanism, which is responsive to a control signal from the exhaust-valve shutdown circuit of ECU 22 for selectively bring sub rocker arm 35 into or out of engagement with main rocker arm 34.

As best seen in FIG. 3, hydraulic pressure is supplied from an oil pump 42 into hydraulically-operated plunger 39 through a hydraulic pressure line 41 defined in rocker shaft 33. Also provided is an electromagnetic solenoid-operated directional control valve 43. When directional control valve 43 is energized and held at its first valve position, directional control valve 43 operates to establish fluid-communication between the discharge port of pump 42 and hydraulic pressure line 41, and simultaneously to block fluid-communication between a drain line 44 and hydraulic pressure line 41. Conversely when directional control valve 43 is de-energized and held at its second valve position, directional control valve 43 operates to establish fluid-communication between the discharge port of pump 42 and drain line 44, and simultaneously to establish fluid-communication between drain line 44 and hydraulic pressure line 41. Switching between the first and second valve positions of directional control valve 43 is controlled in response to a control current (an exhaust-valve VVL control signal) from ECU 22.

The cam profile of high-speed cam 31 of the exhaust-valve side is designed to provide almost the same valve lift as each rockable cam 9 of the intake-valve side. Therefore, as can be seen from comparison between the maximum intake-valve lift LImax characteristic of FIG. 7 and the maximum exhaust-valve lift LEmax characteristic of FIG. 7, the maximum lift LEmax of each exhaust valve 5 is set to be substantially identical to the maximum intake-valve lift LImax characteristic of FIG. 7.

Hereunder described briefly in reference to FIGS. 3, 6A–6B, and 7 is the operation of exhaust-valve VVL mechanism 3. In a low load range, such as during cruising of the vehicle at low engine load operation or during vehicle coasting at low engine load operation, directional control valve 43 is de-energized in response to a control current (an exhaust-valve VVL control signal) generated from ECU 22 and determined based on the low engine load condition. With directional control valve 43 de-energized and held at the second valve position, fluid-communication between the discharge port of pump 42 and drain line 44 and fluid-communication between drain line 44 and hydraulic pressure line 41 are simultaneously established, and as a result pressurized working fluid discharged from oil pump 42 is drained via directional control valve 43 and drain line 44 directly into an oil pan and thus there is no hydraulic-pressure supply to plunger 39. Therefore, the first end of lever member 38 is kept out of engagement with sub rocker arm 35 by way of the spring force of return spring 40 (see FIG. 6A), so that sub rocker arm 35 is uncoupled from main rocker arm 34 to allow the lost-motion operating mode of sub rocker arm 35. During the lost-motion operating mode of sub rocker arm 35, there is no lifting force applied from high-speed cam 31 to main rocker arm 34. That is, the two cam-follower portions of main rocker arm 34 are merely kept in cam-connection with or in sliding-contact with the respective cylindrical cams 32, 32. In such a case (during low engine load operation), the actual exhaust-valve lift becomes a zero lift LE0 (see the exhaust-valve zero lift LE0 characteristic shown in FIG. 7). As a result, exhaust valves 5 included in the first group of cylinders, subjected to cylinder cutoff control (or the partly-inactive cylinder operating mode), become shifted to their exhaust-valve shut-down states. As previously described, during low load operation, intake valves 4 included in the first group of cylinders, subjected to cylinder cutoff control, also become shifted to their intake-valve shutdown states. As a consequence, the engine is conditioned in the partly-inactive cylinder operating mode (the cylinder cutoff mode) where the first group of cylinders are inactive and the second group of cylinders are active (working).

Conversely, when the engine/vehicle operating condition shifts or changes from a low load range to a high load range, directional control valve 43 is energized in response to a control current (an exhaust-valve VVL control signal) generated from ECU 22 and determined based on the high engine load condition. With directional control valve 43 energized and held at the first valve position, fluid-communication between the discharge port of pump 42 and drain line 44 is blocked and simultaneously fluid-communication between the discharge port of pump 42 and hydraulic pressure line 41 is established. As a result, pressurized working fluid discharged from oil pump 42 is delivered through directional control valve 43 and hydraulic pressure line 41 into plunger 39. That is, hydraulic pressure acts on an axial end (a pressure-receiving surface) of plunger 39. Therefore, when the base-circle portion of high-speed cam 31 comes into sliding-contact with the cam-follower portion of sub rocker arm 35, the first end of lever member 38 is brought into engagement with the underside jaw-shaped, recessed portion of sub rocker arm 35 against the spring force of return spring 40 by plunger 39 pushing out (see FIG. 6B). As a result, sub rocker arm 35 is coupled with main rocker arm 34, to permit oscillating motion of sub rocker arm 35 together with main rocker arm 34. Therefore, when a change from a low load range to a high load range occurs, or when switching from the de-energized state of directional control valve 43 to the energized state occurs, main rocker arm 34 oscillates in accordance with a cam profile of high-speed cam 31. The valve lift characteristic of each exhaust valve 5 is switched from the zero lift LE0 characteristic to the maximum lift LEmax characteristic (see FIG. 7). In other words, according to the previously-noted exhaust-valve VVL mechanism 3, switching between the zero lift LE0 characteristic and the maximum lift LEmax characteristic for each exhaust valve 5 can be attained by way of ON-OFF control for the electromagnetic solenoid of directional control valve 43.

Figure 9:
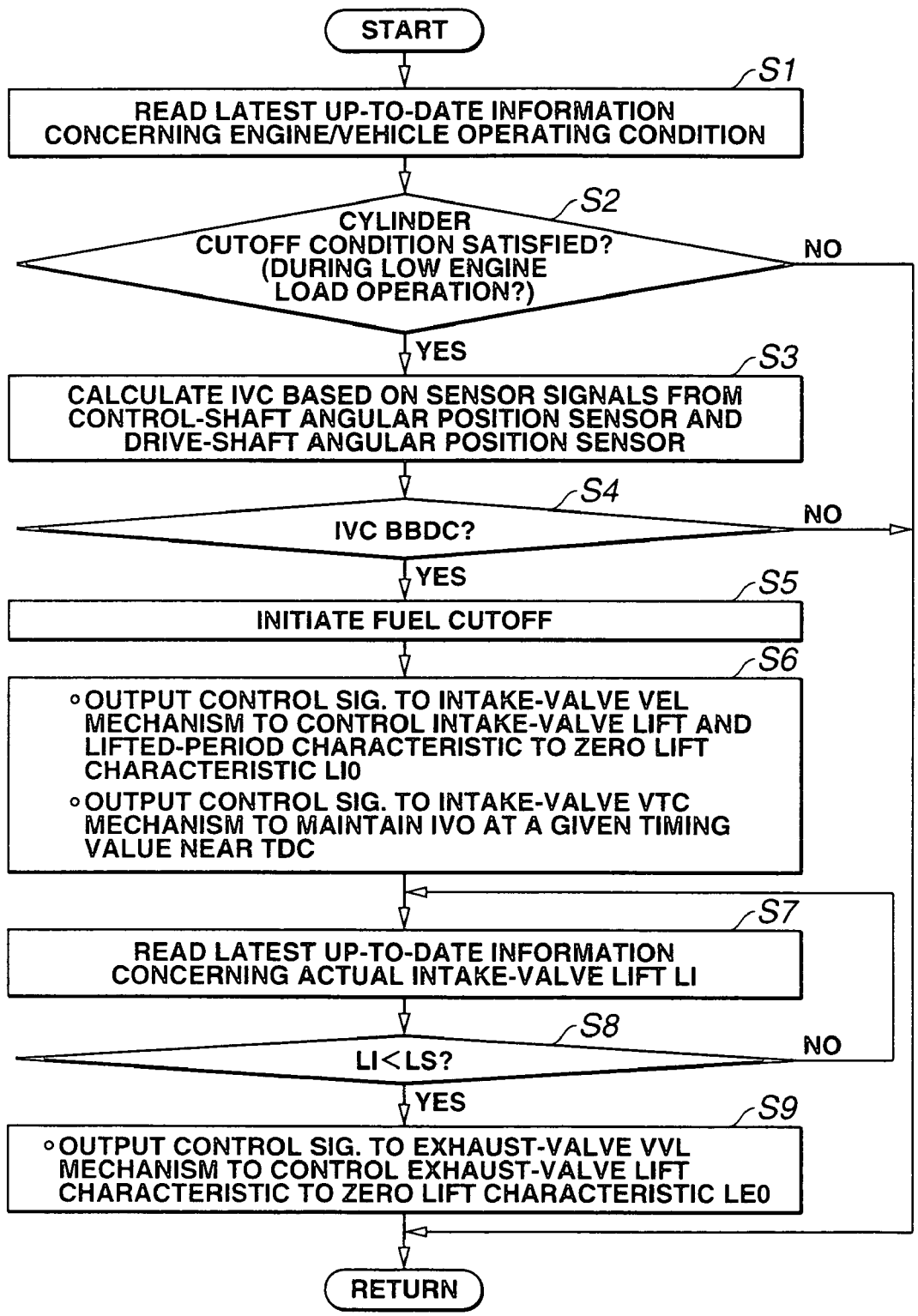
FIG. 9 is a flow chart showing a cylinder cutoff control routine executed within a controller incorporated in the cylinder cutoff control apparatus of the embodiment.

Referring now to FIG. 9, there is shown the cylinder cutoff control routine executed within the processor of ECU 22 incorporated in the apparatus of the embodiment. The cylinder cutoff control routine shown in FIG. 9 is executed as time-triggered interrupt routines to be triggered every predetermined time intervals such as 10 milliseconds.

At step S1, latest up-to-date information (concerning the current engine/vehicle operating condition) from the engine/vehicle switches and sensors, that is, the engine speed sensor, the accelerator opening sensor, the vehicle speed sensor, the range gear position switch, and the crank angle sensor, is read.

At step S2, a check is made to determine whether the current engine/vehicle operating condition is identical to a predetermined cylinder cutoff control enabling condition, simply, a predetermined cylinder cutoff condition. The predetermined cylinder cutoff condition corresponds to a low engine load condition such as a vehicle cruising condition or a vehicle coasting condition. When the answer to step S2 is in the negative (NO), one execution cycle of the cylinder cutoff control routine terminates. Conversely when the answer to step S2 is in the affirmative (YES), the routine proceeds from step S2 to step S3.

At step S3, intake valve closure timing IVC of intake valve 4 is detected or determined. Concretely, latest up-to-date information (sensor signals) from control-shaft angular position sensor 28 and drive-shaft angular position sensor 29 is read. The current intake-valve lift and intake-valve open period characteristic is determined or estimated based on the current sensor signal value from control-shaft angular position sensor 28, representative of the current angular position (the current angular phase) of control shaft 17. An angular phase difference of intake-valve VTC mechanism 2, in other words, a phase difference of drive shaft 6 relative to the drive ring (the substantially cylindrical-hollow timing sprocket member driven by the crankshaft), is determined or estimated based on a difference between the current sensor signal value from drive-shaft angular position sensor 29, representative of the current angular phase of drive shaft 6, and the current sensor signal value from the crank angle sensor, representative of the current crankangle of the crankshaft. Then, the current value of intake valve closure timing IVC is arithmetically calculated based on (i) the determined current intake-valve lift and lifted-period characteristic (in particular, the determined intake-valve open period) and (ii) the angular phase difference of intake-valve VTC mechanism 2 (that is, the determined phase difference of drive shaft 6 relative to the drive ring (the crankshaft)).

At step S4, a check is made to determine whether the current intake valve closure timing IVC of intake valve 4 is a timing value before the B.D.C. position of piston 01. When the answer to step S4 is negative (NO), that is, the current IVC, calculated through step S3, is phase-retarded in comparison with the B.D.C. position of piston 01, one execution cycle of the cylinder cutoff control routine terminates. Conversely when the answer to step S4 is affirmative (YES), that is, the current IVC, calculated through step S3, is phase-advanced in comparison with the B.D.C. position of piston 01, in other words, the current IVC is controlled or adjusted to a given timing value before B.D.C., the routine proceeds from step S4 to step S5.

At step S5, the fuel cutoff circuit of ECU 22 initiates a fuel cutoff mode, which is achieved by means of the electronic fuel-injection system including fuel injectors 08. The fuel cutoff mode is initiated prior to initiation of the cylinder cutoff mode (cylinder cutoff operation), which is executed in accordance with a series of steps S6–S9 hereunder described in detail.

At step S6, an intake-valve VEL control signal (a control current or an intake-valve shutdown signal generated by the intake-valve shutdown circuit of ECU 22) is output or applied to motor 20 of intake-valve VEL mechanism 1 so as to control the intake-valve lift and lifted-period characteristic of intake valve 4 to the zero lift and lifted-period LI0 characteristic. At the same time, an intake-valve VTC control signal (a phase control signal) is output to intake-valve VTC mechanism 2 so as to maintain or hold intake valve open timing IVO of intake valve 4 at a given timing value substantially close to the T.D.C. position of piston 01 (see the timing value substantially corresponding to 360° crankangle, which corresponds to TDC at the beginning of the intake stroke, in the right-hand side intake-valve lift and timing characteristic diagram of FIG. 7).

At step S7, information about an actual intake-valve lift LI is read. Concretely, latest up-to-date information (a more recent sensor signal) from control-shaft angular position sensor 28 is read again. The current value of actual intake-valve lift LI of intake valve 4 is determined or estimated based on the more recent sensor signal value from control-shaft angular position sensor 28, representative of the current angular position (the current angular phase) of control shaft 17. After step S7, step S8 occurs.

At step S8, a check is made to determine whether the actual intake valve lift LI is less than a predetermined intake-valve lift threshold value LS. When the answer to step S8 is negative (LI≧LS), the routine returns from step S8 to step S7. Conversely when the answer to step S8 is affirmative (LI<LS), the routine advances to step S9.

At step S9, an exhaust-valve VVL control signal (a control current or an exhaust-valve shutdown signal generated from the exhaust-valve shutdown circuit of ECU 22) is output to the electromagnetic solenoid of directional control valve 43 of exhaust-valve VVL mechanism 3 so as to de-energize the electromagnetic solenoid of directional control valve 43 to establish fluid communication between the discharge port of pump 42 and drain line 44, and simultaneously to establish fluid-communication between drain line 44 and hydraulic pressure line 41. There is no hydraulic-pressure supply to plunger 39. Thus, lever member 38 is kept out of engagement with sub rocker arm 35 by way of the spring force of return spring 40, such that sub rocker arm 35 is uncoupled from main rocker arm 34 to allow the lost-motion operating mode of sub rocker arm 35, and thereby to control the exhaust-valve lift characteristic of exhaust valve 5 to the zero lift LE0 characteristic.

As discussed above, via a series of steps S6–S9, executed just after execution of the fuel cutoff mode of step S5, the cylinder cutoff operation has been completed to keep the first group of cylinders inactive and simultaneously to keep the second group of cylinders active.

According to the cylinder cutoff control routine shown in FIG. 9, in a transition from the normal vehicle running state (the low engine load operation) via the fuel cutoff mode to the cylinder cutoff mode, it is possible to effectively suppress or reduce an undesirably great engine braking effect, in other words, an uncomfortable engine braking shock.

Figure 16A:
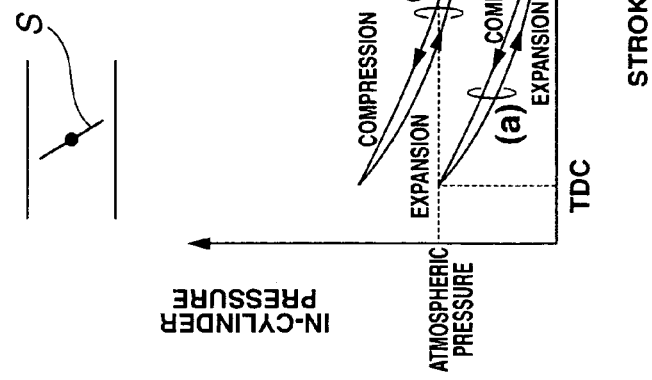
FIGS. 16A–16C are the P-V diagrams obtained by the internal combustion engine employing the earlier cylinder cutoff control device executable intake-air control based on throttle opening control.
Figure 16B:
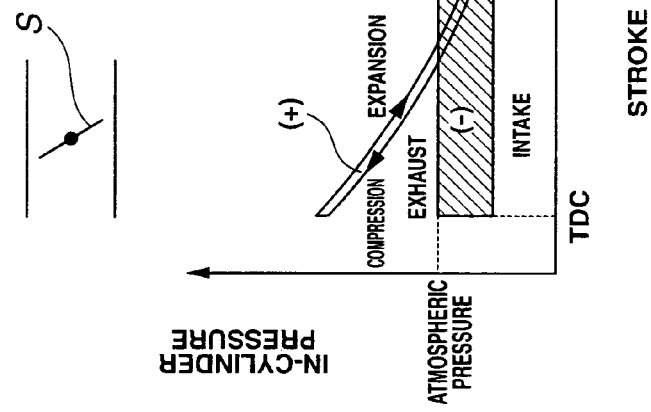
Figure 16C:
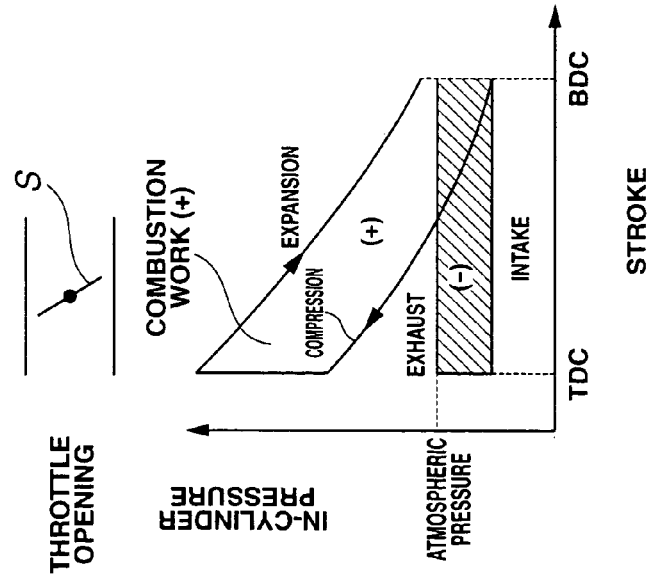

Referring now to FIGS. 8–8C, there are shown the pressure-volume diagrams (the P-V diagrams), obtained by the internal combustion engine employing the cylinder cutoff control apparatus of the embodiment shown in FIGS. 1 and 7. As seen from the P-V diagram of FIG. 8A, during the normal vehicle running state (at low engine load operation), the entire cycle of events of the engine employing the cylinder cutoff control apparatus of the embodiment is completed in four piston strokes, which are intake, compression, expansion, and exhaust of these four strokes provided by the engine of the embodiment, the P-V characteristics corresponding to the compression, expansion, and exhaust strokes are similar to those provided by the internal combustion engine employing the earlier cylinder cutoff control device shown in FIG. 16A. However, the P-V characteristic (see FIG. 8A) corresponding to the intake stroke provided by the engine of the embodiment is remarkably different from that provided by the engine employing the earlier cylinder cutoff control device shown in FIG. 16A. This is because, in the engine of the embodiment, on intake stroke, the throttle opening of the electronically-controlled throttle valve unit is usually held at the predetermined constant value substantially corresponding to the substantially unthrottled position (the substantially full-open position), and intake valve closure timing IVC of intake valve 4 is set or controlled to a given timing value before the B.D.C. position of piston 01, and thus the intake-valve open period (the working angle of intake valve 4) becomes short in comparison with the engine as shown in FIGS. 16–16C. In other words, the length of piston stroke S of piston 01, obtained during the intake-valve open period, that is, intake-valve open stroke SI becomes comparatively short. Therefore, it is possible to greatly reduce a gas exchange loss (corresponding to the right-hand diagonal shading area indicated by the minus sign (−) in FIG. 8A). Thereafter, when the first necessary condition described in step S2 of FIG. 9 and the second necessary condition described in step S4 of FIG. 9 are both satisfied, the fuel cutoff mode is initiated through step S5 of FIG. 9. During the fuel cutoff mode, as shown in FIG. 8B, in the engine of the embodiment, on intake stroke, intake valve closure timing IVC is set or controlled to a given timing value before the B.D.C. position of piston 01, and therefore the gas exchange loss is greatly reduced. Owing to the greatly reduced gas exchange loss, during the fuel cutoff mode, it is possible to effectively suppress the engine braking torque, thus avoiding an unnatural feeling that the driver experiences an uncomfortable engine braking shock. After the fuel cutoff mode has been executed, in accordance with a series of steps S6–S9 of FIG. 9, the intake-valve-advance cylinder cutoff mode is executed. In the same manner as the first P-V diagram (a) shown in FIG. 16C, as can be appreciated from the P-V characteristic shown in FIG. 8C, intake valves 4 included in the first group of cylinders, subjected to cylinder cutoff control, are shifted to their valve shutdown states prior to shifting exhaust valves 5 included in the first group of cylinders to their valve shutdown states. In the P-V characteristic diagram shown in FIG. 8C, in other words, during the intake-valve-advance cylinder cutoff mode, fresh air is confined in the inactive cylinder, and only two piston strokes, that is, compression stroke from BDC to TDC and expansion stroke from TDC to BDC are repeatedly executed. Thus, there is a less gas exchange loss during the intake-valve-advance cylinder cutoff mode, thereby producing a less engine braking effect. Generally, during a transition from the fuel cutoff mode to the cylinder cutoff mode, there is an increased tendency for an engine braking shock to occur owing to a rapid change (i.e., a rapid drop) in engine braking torque. According to the cylinder cutoff control of the embodiment, the engine braking torque has already been properly temporarily reduced to a middle engine braking torque value during the fuel cutoff mode. Therefore, it is possible to effectively suppress a rapid change (i.e., a rapid drop) in engine braking torque during the transition from the fuel cutoff mode to the cylinder cutoff mode.

Furthermore, switching to the zero lift LE0 characteristic of each of exhaust valves 5, 5 is initiated depending on whether the actual intake-valve lift LI is less than predetermined lift threshold value LS. That is, only when the condition defined by LI<LS is satisfied, switching to the zero lift LE0 characteristic of each exhaust valve 5 occurs. That is, switching to the zero lift LE0 characteristic of each exhaust valve 5 is initiated, immediately when the intake-valve lift amount has reached or reduced to the zero lift LI0 after initiation of a reduction in the intake-valve lift amount by means of intake-valve VEL mechanism 1. This effectively prevents or suppresses a difference in each cylinder's individual in-cylinder pressure values during the transition to the cylinder cutoff mode, thus enabling stable in-cylinder pressures in the first group of cylinders, subjected to cylinder cutoff control, during the transition from the fuel cutoff mode to the cylinder cutoff mode and after the cylinder cutoff operation has been completed.

Additionally, exhaust-valve VVL mechanism 3 incorporated in the cylinder cutoff control apparatus of the embodiment, is designed to variably control or adjust the exhaust-valve lift characteristic in a stepwise manner. Concretely, by way of ON-OFF control for the electromagnetic solenoid of directional control valve 43, switching between the zero lift LE0 characteristic and the maximum lift LEmax characteristic for each exhaust valve 5 is attained. Thus, it is possible to quickly momentarily control or adjust the exhaust-valve lift characteristic to the zero lift LE0 characteristic, just after the intake-valve lift amount has reached or reduced to the zero lift LI0. This effectively prevents air from flowing from combustion chamber 06 to exhaust port 03, thereby avoiding a deterioration in exhaust emission control due to an undesirably air-cooled catalyst disposed in the exhaust passage.

Moreover, according to the cylinder cutoff control apparatus of the embodiment, the intake valve lift amount of intake valve 4, whose shutdown operation is executed at high speeds prior to shutdown operation of exhaust valve 5 during a transition from a fuel cutoff mode to a cylinder cutoff mode, can be determined or estimated based on the sensor signal from control-shaft angular position sensor 28, indicative of the angular position (the angular phase) of control shaft 17. A simple, popular, high-precision angular position sensor can be utilized to detect or estimate the actual intake-valve lift amount.

Furthermore, according to the cylinder cutoff control apparatus of the embodiment, at the same time when the intake-valve lift and lifted-period characteristic of intake valve 4 is adjusted to the zero lift and lifted-period LI0 characteristic by means of intake-valve VEL mechanism 1 during the transition from the fuel cutoff mode to the cylinder cutoff mode, intake valve open timing IVO of intake valve 4 is held at a given timing value near the T.D.C. position of piston 01 by means of intake-valve VTC mechanism 2. This prevents intake valve open timing IVO from excessively phase-advancing or excessively phase-retarding with respect to the T.D.C. position of piston 01. Therefore, it is possible to prevent an increased resistance against the downward motion of piston 01, whose increased resistance may be created owing to a negative pressure (a vacuum below an atmospheric pressure level) developing in the inactive cylinder, subjected to cylinder cutoff control, due to the downstroke of piston 01 during the early stages of intake stroke in case of intake valve open timing IVO excessively phase-retarded with respect to TDC, thereby preventing a pumping loss from being increased and consequently ensuring improved fuel economy (reduced fuel consumption rate). In addition to the above, it is possible to effectively suppress or prevent exhaust gases from being sucked into the inactive cylinder, subjected to cylinder cutoff control, due to the downstroke of piston 01 during the early stages of intake stroke in case of intake valve open timing IVO excessively phase-advanced with respect to TDC, thereby avoiding a deterioration in combustion and preventing contaminants contained in exhaust gases from entering the inactive cylinder, subjected to cylinder cutoff control, during the transition to the cylinder cutoff mode.

Figure 10:
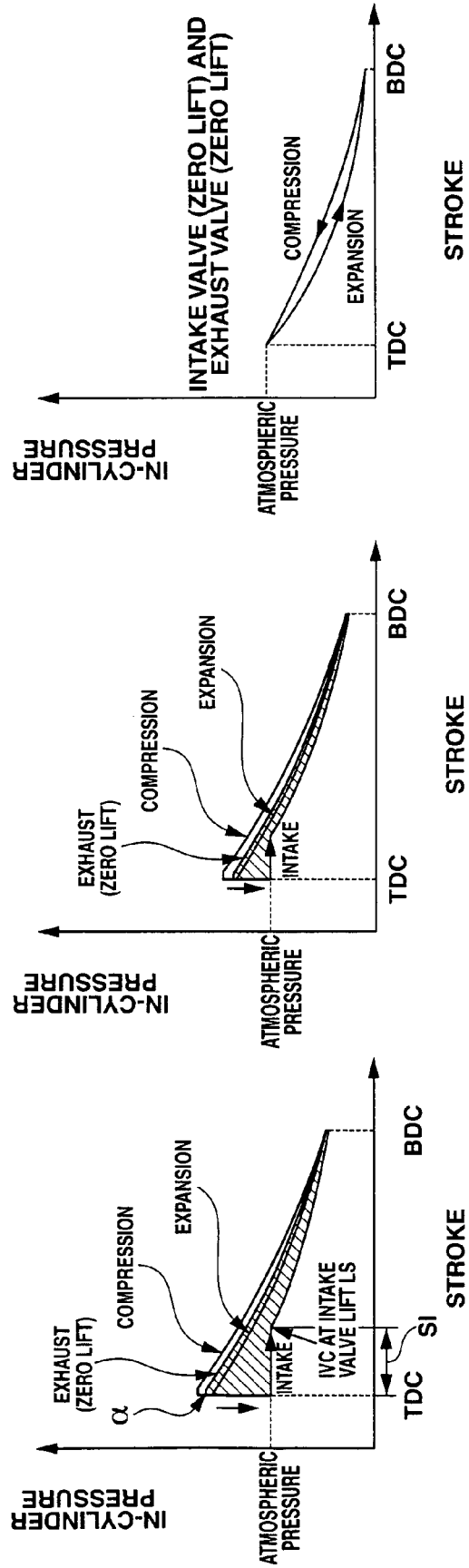
FIGS. 10A–10C are P-V diagrams obtained by an internal combustion engine employing a first modified cylinder cutoff control apparatus, and respectively produced (i) under a valve operating condition where an intake valve is controlled to a predetermined lift and an exhaust valve is controlled to a zero-lift position, (ii) under a valve operating condition where the intake valve is controlled to a further reduced lift from the predetermined lift shown in FIG. 10A, and (iii) during a cylinder cutoff mode.

Referring now to FIGS. 10A–10C, there are shown the P-V diagrams obtained by the engine employing the first modified cylinder cutoff control apparatus in which exhaust valves 5 included in the first group of cylinders, subjected to cylinder cutoff control, are preferentially shifted to their valve shutdown states before shifting intake valves 4 included in the first group of cylinders to their valve shutdown states, after the fuel cutoff mode as shown in FIG. 8B has been initiated and thereafter the intake-valve lift amount LI of intake valve 4 has been reduced to below threshold value LS. That is, according to the first modified cylinder cutoff control apparatus shown in FIGS. 10A–10C, as soon as the intake valve lift amount LI of intake valve 4 reaches and reduces to below threshold value LS by means of intake-valve VEL mechanism 1, the exhaust valve lift amount of exhaust valve 5 is quickly momentarily controlled or adjusted to the zero lift LE0 by means of exhaust-valve VVL mechanism 3 responsively to a transition from the state defined by the inequality LI≧LS to the state defined by the inequality LI<LS. In this case, as can be seen from comparison between the P-V diagrams of FIGS. 8B and 10A, during induction stroke, the intake-valve open period (the working angle of intake valve 4), in other words, the length of piston stroke S, obtained during the intake-valve open period, can be further shortened. Due to the further reduced intake-valve open period, the in-cylinder pressure, created when piston 01 reaches the B.D.C. position on intake stroke, tends to be further lowered. Subsequently to intake stroke, compression and expansion strokes occur. These compression and expansion strokes are included on and after the second cycle of events after fuel cutoff, and thus there is no combustion work created by combustion gases. The compression stroke characteristic curve becomes relatively slightly lowered by a friction loss in comparison with the expansion stroke characteristic curve. After piston 01 has reached the B.D.C. position on expansion stroke, an exhaust stroke occurs. At this time, the exhaust-valve lift amount of exhaust valve 5 has been already controlled to the zero lift LE0, and thus the in-cylinder pressure becomes a peak pressure value at the exhaust-stroke T.D.C. position, indicated by the Greek letter a (alpha). In the P-V diagram shown in FIG. 10A, the right-hand diagonal shading area defined between the exhaust stroke characteristic curve and the intake stroke characteristic curve indicates a gas exchange loss. The gas exchange loss indicated by the right-hand diagonal shading area of FIG. 10A is almost the same level as the gas exchange loss, substantially corresponding to the right-hand diagonal shading area indicated by the minus sign (−) in FIG. 8B, created before exhaust valves 5 included in the first group of cylinders, subjected to cylinder cutoff control, are shifted to their valve shutdown states. More exactly, the gas exchange loss indicated by the right-hand diagonal shading area of FIG. 10A is almost the same level as the gas exchange loss, created just before exhaust valves 5 included in the first group of cylinders, subjected to cylinder cutoff control, are shifted to their valve shutdown states immediately when the actual intake valve lift amount LI of intake valve 4 reaches and reduces to below threshold value LS. Thus, it is possible to effectively suppress an uncomfortable engine braking shock, which may occur during the transition to the exhaust-valve shutdown state. As appreciated from a change from the P-V diagram shown in FIG. 10A to the P-V diagram shown in FIG. 10B, when the actual intake valve lift amount LI of intake valve 4 further reduces from threshold value LS by means of intake-valve VEL mechanism 1, the length of piston stroke S, obtained during the intake-valve open period, that is, intake-valve open stroke SI further reduces, and thus peak pressure value a at the exhaust-stroke T.D.C. position also falls. Thereafter, as appreciated from a change from the P-V diagram shown in FIG. 10B to the P-V diagram shown in FIG. 10C, when the actual intake valve lift amount LI of intake valve 4 finally becomes the zero lift LI0, the length of piston stroke S, obtained during the intake-valve open period, also becomes zero, and thus subsequently to switching to the exhaust-valve shutdown state, intake valves 4 included in the first group of cylinders, subjected to cylinder cutoff control, become shifted to their intake-valve shutdown states (see FIG. 10C).

As discussed above, even on and after the second cycle of events after fuel cutoff, intake valve closure timing IVC is controlled or adjusted to a given timing value before the B.D.C. position, the cylinder cutoff control apparatus of the embodiment can provide the superior effect that a rapid change in engine braking or an undesirable engine-braking shock can be suppressed or reduced during the transition from the fuel cutoff mode to the cylinder cutoff mode. Additionally, according to the first modified cylinder cutoff control apparatus shown in FIGS. 10–10C, in spite of the so-called exhaust-valve-advance cylinder cutoff mode in which exhaust valves 5 included in the first group of cylinders, subjected to cylinder cutoff control, are shifted to their valve shutdown states prior to shifting intake valves 4 included in the first group of cylinders to their valve shutdown states, the P-V diagram of FIG. 10C created during the cylinder cutoff mode can be set to the first P-V characteristic (a) shown in FIG. 16C. As a result of this, after the cylinder cutoff operation has been completed and the first group of cylinders have been kept inactive and the second group of cylinders have been kept active, it is possible to effectively prevent or reduce a difference in each cylinder's individual in-cylinder pressure values, thereby suppressing generation in undesirable noise and vibrations.

Figure 11:
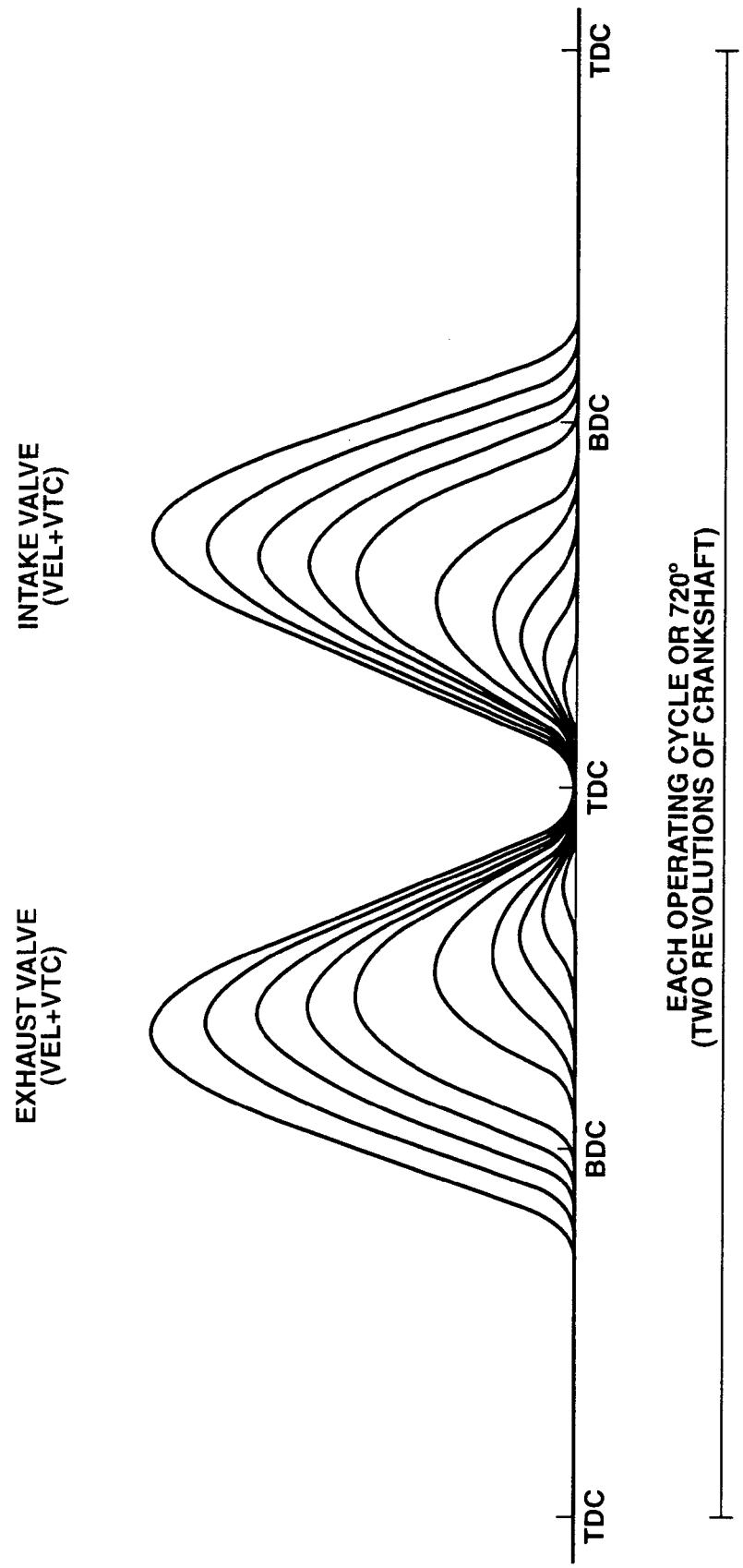
FIG. 11 shows a variable intake-valve lift and timing characteristic diagram and a variable exhaust-valve lift and timing characteristic diagram, obtained by a second modified cylinder cutoff control apparatus.

Referring now to FIG. 11, there are shown the variable valve lift and timing characteristics obtained by the second modified cylinder cutoff control apparatus. As can be seen from the left-hand half of FIG. 11, in the exhaust valve side, the second modified cylinder cutoff control apparatus uses a combination of a continuously variable exhaust valve event and lift control (VEL) mechanism 1e and a variable exhaust valve timing control (VTC) mechanism 2e, instead of using the variable exhaust valve lift (VVL) mechanism 3. On the other hand, in the intake valve side, in the same manner as the apparatus of the embodiment (see the right-hand half of FIG. 7), the second modified cylinder cutoff control apparatus uses a combination of intake-valve VEL mechanism 1 and intake-valve VTC mechanism 2 (see the right-hand half of FIG. 11). Exhaust-valve VEL mechanism 1e and intake-valve VEL mechanism 1 have the same mechanical structure. Exhaust-valve VTC mechanism 2e and intake-valve VTC mechanism 2 have the same mechanical structure.

Concretely, the processor of ECU 22 incorporated in the second modified cylinder cutoff control apparatus includes a cylinder cutoff circuit, and a fuel cutoff circuit. When the current engine/vehicle operating condition matches the predetermined cylinder cutoff condition, the cylinder cutoff circuit of the second modified cylinder cutoff control apparatus outputs an intake-valve VEL control signal to the motor of intake-valve VEL mechanism 1 and also outputs an exhaust-valve VEL control signal to the motor of exhaust-valve VEL mechanism 1e, such that the exhaust-valve lift amount LE of exhaust valve 5 (exactly, the exhaust-valve lift and lifted-period characteristic) is reduced responsively to or in synchronism with or according to or substantially in proportion to a reduction in the intake-valve lift amount LI of intake valve 4 (exactly, the intake-valve lift and lifted-period characteristic). In a similar manner to the apparatus of the embodiment shown in FIGS. 1, 7, 8A–8C, and 9, in the second modified cylinder cutoff control apparatus shown in FIG. 11, during a transition from the fuel cutoff mode to the cylinder cutoff mode, simultaneously with the outputs of the intake-valve VEL control signal and the exhaust-valve VEL control signal, an intake-valve VTC control signal (a phase control signal) is output to intake-valve VTC mechanism 2 so as to maintain or hold intake valve open timing IVO at a given timing value near the T.D.C. position of piston 01 (see the timing value substantially corresponding to 360° crankangle, which corresponds to TDC at the beginning of the intake stroke, in the right-hand side intake-valve lift and timing characteristic diagram of FIG. 11). As can be seen from the right-hand side intake-valve lift characteristic curves (exactly, a plurality of intake-valve lift and lifted-period characteristic curves) shown in FIG. 11, in a similar manner to the apparatus of the embodiment shown in FIGS. 1, 7, 8A–8C, and 9, in the second modified cylinder cutoff control apparatus shown in FIG. 11, intake valve closure timing IVC is set to be gradually phase-advanced, as the maximum valve lifting height of intake valve 4 gradually decreases by means of the intake-valve VEL mechanism 1. At the same time, an exhaust-valve VTC control signal (a phase control signal) is output to the exhaust-valve VTC mechanism 2e so as to maintain or hold exhaust valve closure timing EVC at a given timing value near the T.D.C. position of piston 01 (see the timing value substantially corresponding to 360° crankangle, which corresponds to TDC at the end of the exhaust stroke, in the left-hand side exhaust-valve lift and timing characteristic diagram of FIG. 11). As can be seen from the left-hand side exhaust-valve lift characteristic curves (exactly, a plurality of exhaust-valve lift and lifted-period characteristic curves) shown in FIG. 11, unlike the apparatus of the embodiment shown in FIGS. 1, 7, 8A–8C, and 9, in the second modified cylinder cutoff control apparatus shown in FIG. 11, exhaust valve open timing EVO is set to be gradually phase-retarded, as the maximum valve lifting height of exhaust valve 5 gradually decreases by means of the exhaust-valve VEL mechanism 1e.

The fuel cutoff circuit of the second modified cylinder cutoff control apparatus initiates a fuel cutoff mode, at which fuel supply from fuel injectors 08 to the first group of cylinders, subjected to cylinder cutoff control, is stopped, prior to initiation of the cylinder cutoff mode (cylinder cutoff operation), at which only the first group of cylinders are stopped or cut off.

As discussed above, according to the second modified cylinder cutoff control apparatus, when the current engine/vehicle operating condition matches the predetermined cylinder cutoff condition, such as a low engine load condition (e.g., a vehicle cruising condition or a vehicle coasting condition), and thus the cylinder cutoff control is initiated, as can be appreciated from the right-hand side intake-valve lift and timing characteristic diagram and the left-hand side exhaust-valve lift and timing characteristic of FIG. 11, being substantially symmetrical with respect to the timing value corresponding to 360° crankangle, which corresponds to TDC at the beginning of the intake stroke (at the end of the exhaust stroke), the exhaust-valve lift and lifted-period characteristic and the intake-valve lift and lifted-period characteristic can be synchronously continuously reduced by means of the intake-valve VEL mechanism 1 (exactly, the intake-valve VEL and VTC mechanisms 1 and 2) and the exhaust-valve VEL mechanism 1e (exactly, the exhaust-valve VEL and VTC mechanisms 1e and 2e) during cylinder cutoff control. Synchronously continuously reducing the exhaust-valve lift and lifted-period characteristic and the intake-valve lift and lifted-period characteristic means a smooth, continuous reduction in gas exchange loss (pumping loss) of the internal combustion engine. This more effectively reduces or suppresses an undesirable engine braking shock during cylinder cutoff control.

Figure 12:
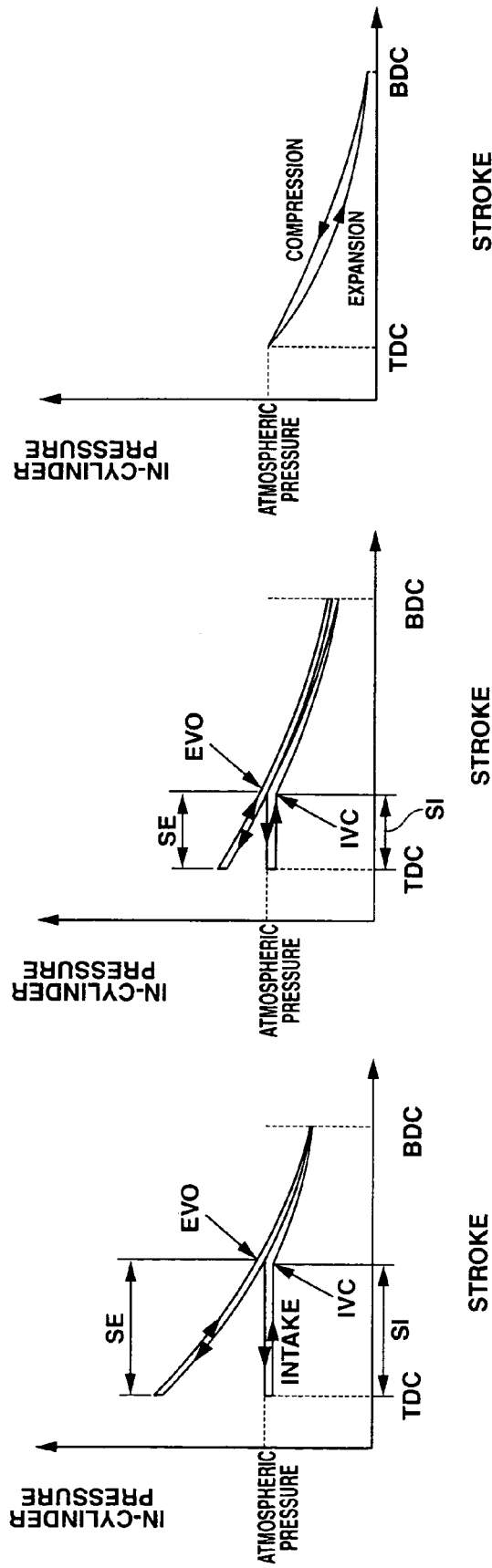
FIGS. 12A–12C are P-V diagrams obtained by an internal combustion engine employing the second modified cylinder cutoff control apparatus, and respectively produced during a fuel cutoff mode, during a valve-lift decrease control, and during a cylinder cutoff mode.

Referring now to FIGS. 12A–12C, there are shown the pressure-volume diagrams (the P-V diagrams), obtained by the internal combustion engine employing the second modified cylinder cutoff control apparatus (the intake-valve VEL and VTC mechanisms 1, 2 and the exhaust-valve VEL and VTC mechanisms 1e, 2e). As seen from the P-V diagram of FIG. 12A, during the fuel cutoff mode, an intake-valve open stroke SI from the T.D.C. position of piston 01 to intake valve closure timing IVC of intake valve 4 is substantially identical to an exhaust-valve open stroke SE from exhaust-valve open timing EVO of exhaust valve 5 to the T.D.C. position. Thus, there is a less generation of gas exchange loss. Thereafter, when the actual intake valve lift amount LI of intake valve 4 further reduces by means of the intake-valve VEL mechanism, as appreciated from a change from the P-V diagram shown in FIG. 12A via the P-V diagram shown in FIG. 12B to the P-V diagram shown in FIG. 12C, exhaust-valve open stroke SE further reduces synchronously with a reduction in intake-valve open stroke SI, while keeping exhaust-valve open stroke SE at a value substantially identical to intake-valve open stroke SI, and thereafter the cylinder cutoff operation has been finally completed. This realizes a smooth transition from the fuel cutoff mode to the cylinder cutoff mode, while effectively suppressing the gas exchange loss. Therefore, according to the second modified cylinder cutoff control apparatus of FIG. 11, it is possible to effectively suppress or avoid an unnatural feeling that the driver experiences an uncomfortable engine braking shock, which may occur during cylinder cutoff control. This is because, according to the second modified cylinder cutoff control apparatus, there is a less gas exchange loss generated during cylinder cutoff control and additionally the gas exchange loss, which may be generated during a transition from the fuel cutoff mode to the cylinder cutoff mode, tends to continuously smoothly reduce.

Furthermore, according to the second modified cylinder cutoff control apparatus of FIG. 11, at the same time when the exhaust-valve lift and lifted-period characteristic of exhaust valve 5 is adjusted to the zero lift and lifted-period LE0 characteristic by means of the exhaust-valve VEL mechanism 1e during the transition from the fuel cutoff mode to the cylinder cutoff mode, exhaust valve closure timing EVC of exhaust valve 5 is held at a given timing value near the T.D.C. position of piston 01 by means of the exhaust-valve VTC mechanism 2e. This prevents exhaust valve closure timing EVC from excessively phase-advancing or excessively phase-retarding with respect to the T.D.C. position of piston 01. Therefore, it is possible to prevent combustion gas from being confined in the inactive cylinder during the last stages of exhaust stroke in case of exhaust valve closure timing EVC excessively phase-advanced with respect to TDC, thereby preventing increased cooling loss, increased pumping loss, and consequently ensuring improved fuel economy (reduced fuel consumption rate). In addition to the above, it is possible to effectively suppress or prevent exhaust gases from being sucked into the inactive cylinder during the last stages of exhaust stroke in case of exhaust valve closure timing EVC excessively phase-retarded with respect to TDC, thereby avoiding or suppressing contaminants contained in exhaust gases from entering the inactive cylinder during the transition to the cylinder cutoff mode.

Figure 13:
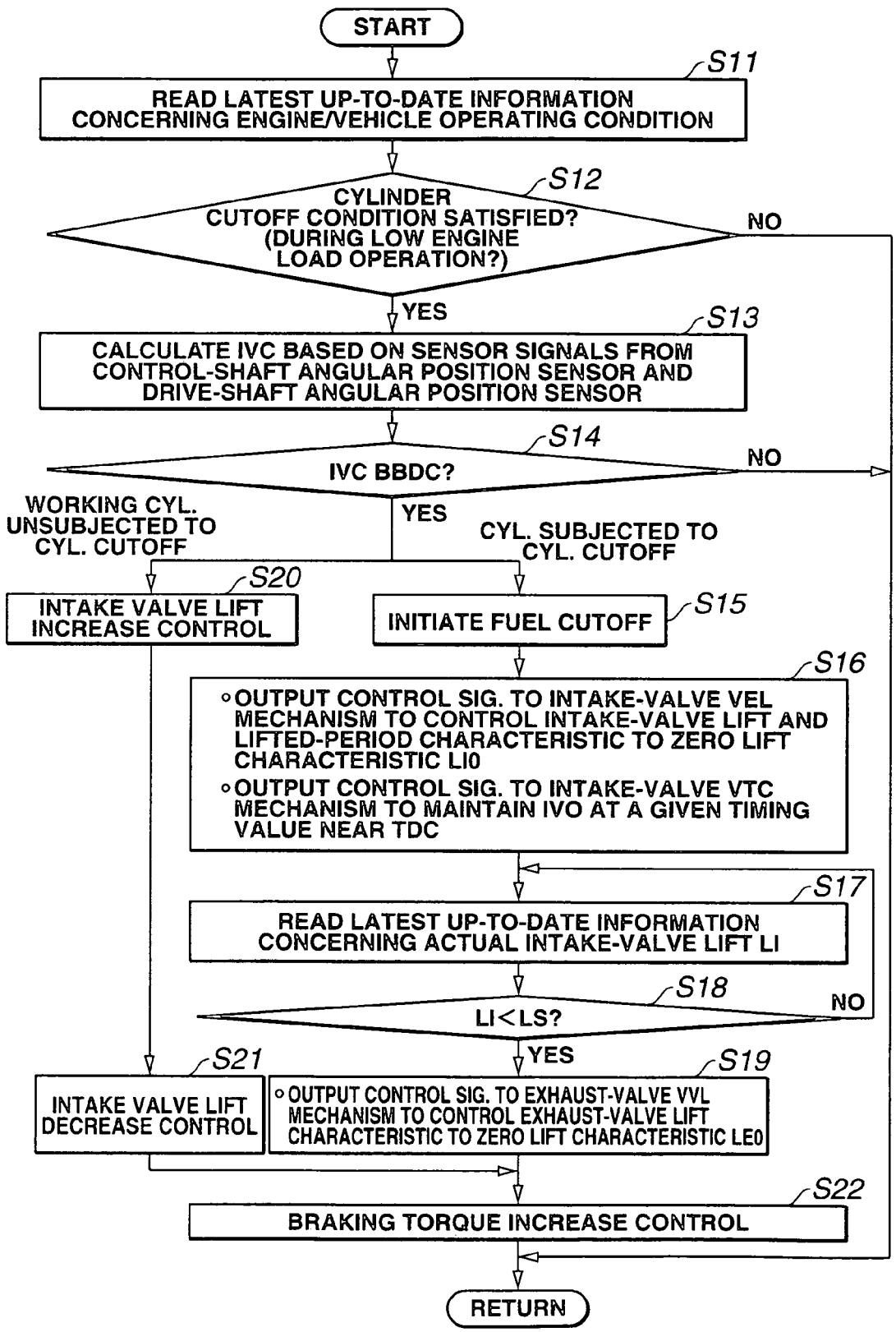
FIG. 13 is a flow chart showing a cylinder cutoff control routine executed within a controller incorporated in a third modified cylinder cutoff control apparatus.

Referring now to FIG. 13, there is shown the cylinder cutoff control routine executed within ECU 22 incorporated in the third modified cylinder cutoff control apparatus. Steps S11–S19 of the control routine shown in FIG. 13 are identical to steps S1–S9 of the control routine of FIG. 9. The third modified cylinder cutoff control apparatus of FIG. 13 is slightly modified from the apparatus of the embodiment shown in FIGS. 1, 7, 8A–8C, and 9 or the second modified cylinder cutoff control apparatus of FIGS. 11 and 12A–12C, in that, in the third modified cylinder cutoff control apparatus of FIG. 13 steps S20–S22 are further added. That is, in the third modified cylinder cutoff control apparatus, simultaneously with a first branched flow including a fuel cutoff mode (see step S15 of FIG. 13) and a cylinder cutoff mode or cylinder cutoff operation (see steps S16–S19 in FIG. 13) for the first group of cylinders, subjected to cylinder cutoff control, a second branched flow including a driving torque compensation operating mode (see engine-torque compensation steps S20–S21 executed in parallel with a series of steps S15–S19) is executed for the second group of cylinders (working cylinders), unsubjected to the cylinder cutoff control. By virtue of the second branched flow (steps S20–S21), serving as an engine-torque compensation circuit during a time period from the fuel cutoff mode to the cylinder cutoff mode, an intake valve lift amount of each of intake valves 4 included in the second group (working cylinders) is controlled to compensate for undesirable changes in engine braking during the cylinder cutoff control. Also provided is a braking-torque compensation step S22 (serving as a braking-torque compensation circuit), in order to more effectively compensate for an undesirably great fall in engine braking torque during the cylinder cutoff control by way of forcible braking torque application (forcible negative torque application). As a variable intake-valve lift mechanism, the third modified cylinder cutoff control apparatus of FIG. 13 uses the previously-described VEL mechanism 1 (see FIG. 2). As a variable exhaust-valve lift mechanism, the third modified cylinder cutoff control apparatus uses the previously-described VVL mechanism 3 (see FIG. 3). Instead of using the VVL mechanism 3, the VEL mechanism 1 may be used as a variable exhaust-valve lift mechanism of the third modified cylinder cutoff control apparatus. The control routine of FIG. 13 is also executed as time-triggered interrupt routines to be triggered every predetermined time intervals such as 10 milliseconds. As discussed above, steps S11–S19 of FIG. 13 are identical to steps S1–S9 of FIG. 9, and thus steps S20–S22 will be hereinafter described in detail with reference to the accompanying drawings, while detailed description of steps S11–S19 will be omitted because the above description thereon seems to be self-explanatory.

When the answer to step S14 is affirmative (YES), the routine is branched into (i) the first branched flow (including the fuel cutoff mode (step S15) and the cylinder cutoff operation (steps S16–S19) for the first group of cylinders) and (ii) the second branched flow (including the driving torque compensation operating mode (steps S20–S21).

At step S20, intake valve lift increase control is executed to momentarily increase the valve lift amount of each of intake valves 4 included in the second group of cylinders (working cylinders), unsubjected to the cylinder cutoff control, by means of intake-valve VEL mechanism 1. That is, when the fuel-cutoff operation is made to each of the first group of cylinders at step S15, a remarkable increase in engine braking torque, corresponding to gas exchange loss, takes place. To decreasingly compensate for or effectively suppress the remarkable engine braking torque increase, responsively to or synchronously with initiation of the fuel cutoff mode of step S15, at step S20 the lift amount (i.e., intake-valve open stroke SI) of each of intake valves 4, included in the second group of cylinders (working cylinders), is momentarily increased. By virtue of the momentary intake valve lift increase control (step S20), which is made to each of the second group of cylinders (working cylinders), and initiated almost simultaneously with initiation of the fuel cutoff mode (step S15), a combustion work, in other words, an engine output torque, is momentarily increased, and whereby the remarkable engine braking torque increase created due to fuel cutoff, which is made to each of the first group of cylinders, can be decreasingly compensated for. Owing to a proper increase in combustion torque, produced by the second group of cylinders (working cylinders), it is possible to more effectively suppress the engine braking shock.

After execution of the intake valve lift increase control of step S20, step S21 occurs.

At step S21, intake valve lift decrease control is made to each of intake valves 4 included in the second group of cylinders (working cylinders). The intake valve lift decrease control is effective or advantageous to avoid a rapid fall in engine braking effect (in other words, a rapid engine torque increase), which may occur when the first group of cylinders become stopped or cut off. For the reasons discussed above, before completion of the cylinder cutoff operation (steps S16–S19) executed subsequently to the fuel cutoff mode (S15), the intake valve lift decrease control (step S21) is initiated to reduce the valve lift amount of each of intake valves 4 included in the second group of cylinders (working cylinders) and thus to lower the combustion torque. This effectively suppresses the previously-noted rapid increase in engine torque at the last stage of the cylinder cutoff operation, thus preventing the unnatural feeling that the driver experiences a poor engine braking effect (an undesirably small engine braking torque), occurring when the first group of cylinders become stopped or cut off. After steps S21 and S19, the routine proceeds to step S22, that is, the braking-torque compensation step.

At step S22, braking-torque increase control is executed to momentarily automatically avoid a rapid fall in engine braking effect (in other words, a rapid engine torque increase), which may occur when the first group of cylinders become stopped or cut off.

Figure 14:
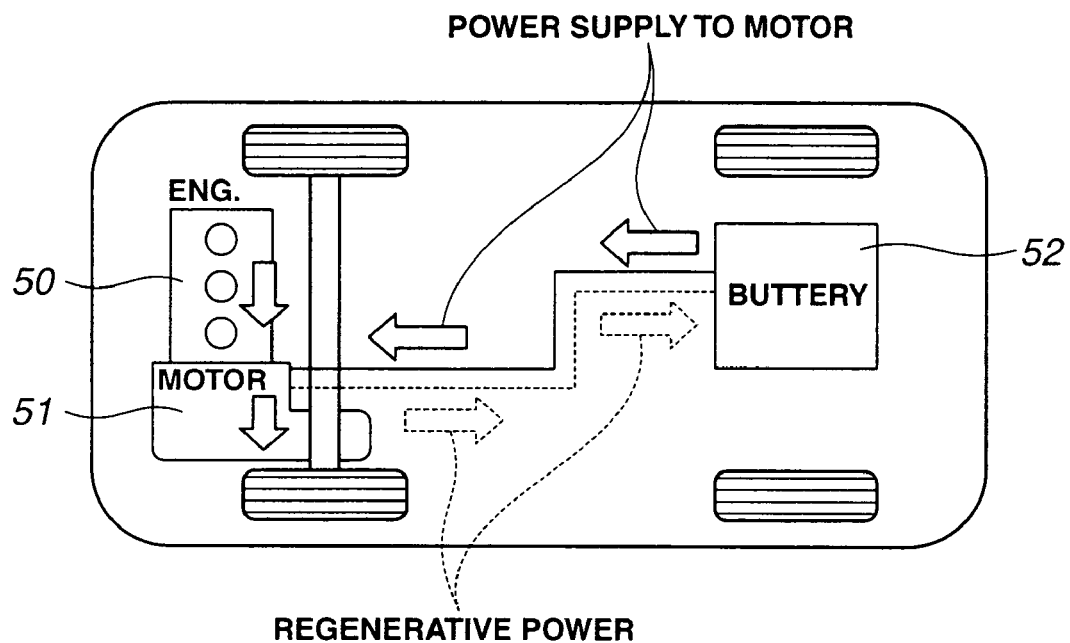
FIG. 14 is a schematic view showing a hybrid vehicle to which the fundamental concept of the cylinder cutoff control apparatus of the present invention can be applied and wherein an intake-valve VEL mechanism and an exhaust-valve VVL mechanism are provided.
Figure 15:
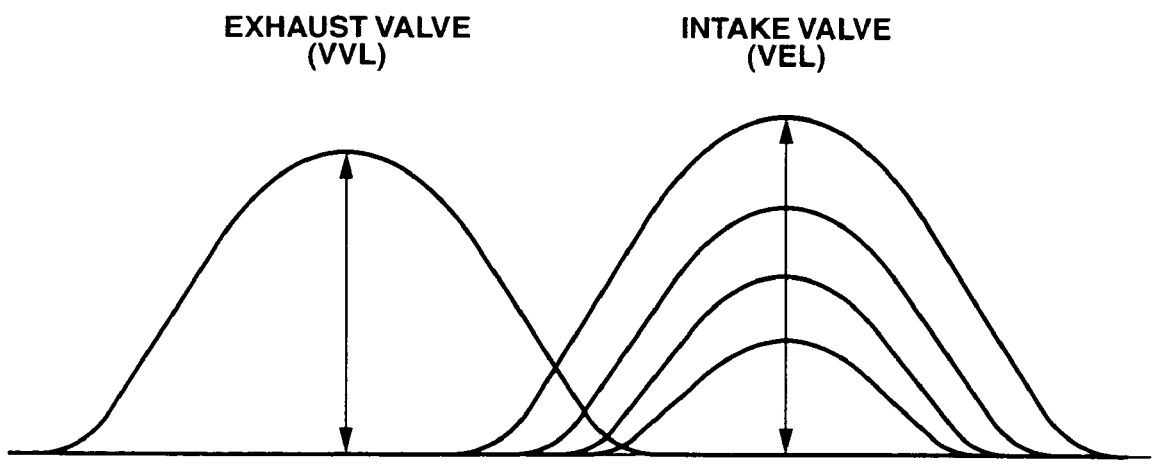
FIG. 15 shows two continuous lift and event control characteristics respectively obtained by the intake-valve VEL mechanism and the exhaust-valve VVL mechanism, both incorporated in the hybrid vehicle of FIG. 14.

Referring now to FIG. 14, there is shown the hybrid vehicle to which the fundamental concept of the cylinder cutoff control apparatus of the present invention can be applied. As can be seen from the schematic view of FIG. 14, the hybrid vehicle employs a parallel hybrid system using both an internal combustion engine (50) and an electric motor (51) as a propelling power source. The hybrid vehicle also employs a battery (an electric power source) 52 for electric-power supply to motor 51. The output shaft of motor 51 is coaxially arranged with respect to and coupled with the engine crankshaft. Regarding engine 50 of the hybrid vehicle of FIG. 14, in the intake valve side (for intake valves 4, 4) a continuously variable intake valve event and lift control (VEL) mechanism 1 is used, while in the exhaust valve side (for exhaust valves 5, 5) a variable exhaust valve lift (VVL) mechanism 3 is used. The right-hand half of FIG. 15 shows a plurality of intake-valve lift and lifted-period characteristic curves created by intake-valve VEL mechanism 1, whereas the left-hand half of FIG. 15 shows two exhaust-valve lift characteristics, namely a zero lift LE0 characteristic and a maximum lift LEmax characteristic, created by exhaust-valve VVL mechanism 3.

The processor of ECU 22 incorporated in the fourth modified cylinder cutoff control apparatus employed in the hybrid vehicle shown in FIG. 14 includes an intake-air quantity control circuit, a fuel cutoff circuit, an intake-valve shutdown circuit, and an exhaust-valve shutdown circuit. In the same manner as the apparatus of the embodiment shown in FIGS. 1, 7, 8A–8C, and 9, in case of the fourth modified cylinder cutoff control apparatus of FIGS. 14–15, the intake-air quantity control circuit operates to control a required quantity of intake air entering the engine mainly by way of intake-valve VEL mechanism 1. The fourth modified cylinder cutoff control apparatus of FIGS. 14–15 is different from the apparatus of the embodiment of FIGS. 1, 7, 8A–8C, and 9, in that, the fourth modified cylinder cutoff control apparatus of FIGS. 14–15 is capable of performing mode-switching between (i) a full cylinder operating mode (an all-cylinder active mode) where all of engine cylinders are working and (ii) an all-cylinder cutoff mode (an all-cylinder inactive mode) where all of the cylinders are inactive. Thus, the intake-valve shutdown circuit generates an intake-valve shutdown signal, responsively to which signal each of intake valves 4, 4 is shifted to a valve shutdown state (or a valve fully-closed state), to the intake-air quantity control circuit in order to initiate the all-cylinder cutoff mode, only when two necessary conditions are satisfied before switching from the all-cylinder operating mode to the all-cylinder cutoff mode. The first necessary condition is a low engine load condition where engine speed is kept constant or decreasing. The second necessary condition is a condition that intake valve closure timing IVC of each of intake valves 4, 4 is controlled to a given timing value before BDC. The fuel cutoff circuit initiates a fuel cutoff mode prior to the all-cylinder cutoff mode initiated by the intake-valve shutdown circuit. The exhaust-valve shutdown circuit reduces an actual exhaust-valve lift of each of exhaust valves 5, 5 to a zero lift by means of exhaust-valve VVL mechanism 3, depending on whether an actual intake-valve lift LI of each of intake valves 4, 4 is less than a predetermined lift threshold value LS.

Additionally, in the hybrid vehicle shown in FIG. 14, during vehicle deceleration, motor 51 serves as a regenerative braking device by which in a regenerative operating mode the rate of recovery of kinetic energy is increased, and at the same time the valve lift amount LI of each of intake valves 4, 4 is controlled to a zero lift LI0 and the valve lift LE of each of exhaust valves 5, 5 is controlled to a zero lift LE0. The fourth modified cylinder cutoff control apparatus of FIGS. 14–15 operates as follows.

During a hybrid-vehicle driving in which cylinder cutoff control is not executed, engine 50 and motor 51 are both driven, and it is possible to control the lifted period (valve open period or working angle) of each of intake valves 4, 4 by means of intake-valve VEL mechanism 1. In such a case, it is possible to operate engine 50 with a throttle valve opening held at or controlled to a substantially unthrottled position (or a substantially full-open position or a full-throttle position). Therefore, it is possible to improve fuel economy of engine 50.

On the contrary, during vehicle deceleration or during vehicle coasting at low engine load operation, switching from the all-cylinder operating mode to the all-cylinder cutoff mode occurs, and thus all of the cylinders are smoothly cut off or stopped by gradually reducing the magnitude of engine braking torque in accordance with the previously-discussed improved cylinder cutoff control routine. Thus, it is possible to effectively suppress an uncomfortable engine braking shock. Additionally, at the time when the cylinder cutoff operation for all of the cylinders has been completed, the engine braking torque can be adequately reduced, and whereby it is possible to increase the regenerative braking torque created by motor 51, and thus to adequately supply electric energy regenerated by motor 51 to battery 52. The regenerated electric energy can be satisfactorily stored in the battery.

Additionally, during the all-cylinder cutoff mode, fresh air cannot enter each engine cylinder, and thereby there is no flow of fresh air into the exhaust pipe. Thus, it is possible to prevent the catalyst fro being undesirably air-cooled, thereby avoiding a deterioration in exhaust emission control.

As is generally known, one way to reduce a gas exchange loss is to operate both of intake and exhaust valves 4 and 5 with the throttle valve fully opened. However, in this case, there is an increased tendency for fresh air to flow from a combustion chamber into an exhaust port and then to flow through a catalyst disposed in an exhaust passage, thus undesirably cooling the catalyst, and consequently deteriorating exhaust emission control. On the other hand, according to the fourth modified cylinder cutoff apparatus of FIGS. 14–15, during the all-cylinder cutoff mode, it is possible to prevent fresh air from flowing into the exhaust pipe by controlling the valve lift of each of intake valves 4, 4 to zero lift LI0 by means of intake-valve VEL mechanism 1, and thus effectively to suppress the catalyst from being undesirably cooled, and consequently to prevent an increase in exhaust emissions. In other words, the limitation or restriction about exhaust emission control can be reduced, and whereby it is possible to increase the frequency of executions of cylinder cutoff control, thereby ensuring adequate regenerated electric energy.

Furthermore, from the viewpoint of reduced fuel consumption of the engine, the hybrid vehicle employing the fourth modified cylinder cutoff control apparatus is advantageous. This is because vehicle acceleration can be motor-assisted by driving electric motor 51 by generated and regenerated electric energy stored in battery 52, and therefore it is possible to lower the load on the engine for vehicle acceleration.

Moreover, according to the hybrid vehicle employing the fourth modified cylinder cutoff control apparatus, in the normal vehicle running state, intake valve closure timing IVC of each of intake valves 4, 4 can be controlled to or held at a given timing value before the B.D.C. position of the piston by way of continuous valve lift amount control achieved by intake-valve VEL mechanism 1. This results in reduced gas exchange loss and reduced friction loss of the valve operating system, thus ensuring the improved fuel economy (decreased fuel consumption rate) of engine 50.

Additionally, during vehicle deceleration, in accordance with the all-cylinder cutoff control, the valve lift of each of intake valves 4, 4 is controlled to zero lift LI0 by means of intake-valve VEL mechanism 1 and the valve lift of each of exhaust valves 5, 5 is controlled to zero lift LE0 by means of exhaust-valve VVL mechanism 3. Therefore, in the vehicle stopped state, the valve lift amount of each of intake and exhaust valves 4 and 5 becomes zero. When the hybrid vehicle has to restart, engine 50 is started up generally by means of motor 51. When starting up engine 50, the valve lift amount of each of intake and exhaust valves 4 and 5 is still kept zero. This contributes to the reduced friction loss of the valve operating system during the engine starting-up period, thus ensuring the enhanced startability of engine 50. That is, it is possible to quickly rise the engine cranking speed owing to the zero intake-valve lift and the zero exhaust-valve lift during the early stage of the starting-up period of engine 50. Thereafter, it is possible to rapidly certainly achieve complete explosion in each individual combustion chamber by increasing the valve lift amount of each of intake and exhaust valves 4 and 5. This enhances the vehicle acceleration performance during the vehicle starting period.

As will be appreciated from the above, according to the cylinder cutoff control apparatus of the embodiment, a quantity of intake air entering each individual cylinder is controlled by the intake-valve operating control mechanism rather than throttle opening control executed by the electronically-controlled throttle. During the low load operation, the intake-air quantity can be controlled by way of continuous intake-valve lift characteristic control executed by the intake-valve operating control mechanism. By presetting or controlling an intake valve closure timing IVC to a given timing value before BDC, it is possible to shorten an intake-valve open stroke SI obtained during an intake valve open period. It is possible to operate the engine with a throttle valve held at a substantially unthrottled position by reducing the intake-air quantity by the continuous intake-valve lift characteristic control, thus greatly reducing a gas exchange loss or a pumping loss. Even during a fuel cutoff mode executed prior to a cylinder cutoff mode, the throttle valve is held at the substantially unthrottled position and the intake valve closure timing IVC is controlled to the given timing value before BDC, thus ensuring the reduced gas exchange loss, and effectively suppressing an undesirably great engine braking torque from being generated. After the transition to the cylinder cutoff mode, there is a less gas exchange loss, thus resulting in a greatly reduced engine-braking effect or a poor engine-braking effect. According to the cylinder cutoff control executed by the apparatus of the embodiment, in the transition from the fuel cutoff mode to the cylinder cutoff mode, it is possible to smoothly reduce engine-braking torque, thus avoiding an uncomfortable engine braking shock. For a time period during which the intake valve lift amount is gradually reducing to a zero lift during the transition to the cylinder cutoff mode, the intake valve closure timing IVC does not pass substantially 30 degrees of crankangle after BDC, at which an increased gas exchange loss is produced. Thus, in the transient state from the fuel cutoff mode to the cylinder cutoff mode, there is no risk of causing an unnatural feeling that the driver experiences an undesirably small engine braking torque. Furthermore, during the transition to the cylinder cutoff mode, the exhaust valve lift amount can be controlled or reduced depending on a change in the intake valve lift amount, thus ensuring stable in-cylinder pressures in inactive cylinders after the cylinder cutoff operation has been completed. An exhaust-valve shutdown circuit of the apparatus of the embodiment reduces the exhaust valve lift amount to the zero lift by the exhaust-valve operating control mechanism, after a reduction in the intake valve lift amount has been initiated by the intake-valve operating control mechanism or the intake valve lift amount has been reduced to the zero lift by the intake-valve operating control mechanism. This effectively prevents or suppresses a difference in each cylinder's individual in-cylinder pressure values during the transition to the cylinder cutoff mode, thus preventing undesirable vibrations and noise from generating. Additionally, the actual intake valve lift amount can be estimated indirectly based on a sensor signal value from a standard angular position sensor capable of detecting an angular position of a control shaft of an attitude control mechanism for a multi-nodular-link motion transmitting mechanism (or a motion converter). Such an angular position sensor is simple in construction and inexpensive in costs and has a high accuracy in detection.

Furthermore, according to the modified cylinder cutoff control apparatus, the exhaust valve lift amount is reduced substantially in proportion to a reduction in the intake valve lift amount, when executing, based on the engine-and-vehicle operating condition, the cylinder cutoff mode. Thus, during the transition from the fuel cutoff mode to the cylinder cutoff mode, it is possible to continuously smoothly reduce the gas exchange loss of the engine, thereby more effectively suppressing or reducing an uncomfortable engine braking shock. Preferably, during the transition to the cylinder cutoff mode, the exhaust valve lift amount is reduced according to the reduction in the intake valve lift amount, while keeping an intake-valve open stroke SI obtained during a valve open period of the intake valve at a value substantially identical to an exhaust-valve open stroke SE obtained during a valve open period of the exhaust valve. This insures a smooth transition from the fuel cutoff mode to the cylinder cutoff mode, while continuously adequately the pumping loss. According to another modified cylinder cutoff control apparatus, a first one of the intake and exhaust valves included in the first group of cylinders, subjected to cylinder cutoff control, is preferentially shifted to a valve shutdown state immediately when the valve lift amount of the second valve reduces to a predetermined value substantially corresponding to the zero lift, while reducing the valve lift amounts of the intake and exhaust valves synchronously with each other, when executing, based on the engine-and-vehicle operating condition, the cylinder cutoff mode. That is, during the cylinder cutoff control, the first valve can be preferentially shifted to its valve shutdown state corresponding to the zero lift, thus ensuring stable in-cylinder pressures in inactive cylinders during the transition from the fuel cutoff mode to the cylinder cutoff mode and after the cylinder cutoff operation has been completed, and consequently preventing a difference in each cylinder's individual in-cylinder pressure values in the transition to the cylinder cutoff mode. This prevents undesirable vibrations and noise from generating.

The entire contents of Japanese Patent Application No. 2004-240262 (filed Aug. 20, 2004) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A cylinder cutoff control apparatus of an internal combustion engine comprising:
    an intake-valve operating control mechanism capable of continuously reducing an intake-valve lift and valve open period characteristic of an intake valve to a zero lift and lifted-period characteristic;
    an exhaust-valve operating control mechanism capable of reducing an exhaust-valve lift characteristic of an exhaust valve to a zero lift characteristic;
    an engine-and-vehicle sensor that detects an engine-and-vehicle operating condition; and
    a control unit configured to be electronically connected to at least the engine-and-vehicle sensor and the valve operating control mechanisms for controlling the valve operating control mechanisms depending on the engine-and-vehicle operating condition; the control unit comprising
        (a) an intake-air quantity control circuit through which a quantity of intake air is controlled by the intake-valve operating control mechanism;
        (b) an intake-valve shutdown circuit that generates an intake-valve shutdown signal to the intake-air quantity control circuit, only when two necessary conditions are both satisfied for initiating, based on the engine-and-vehicle operating condition, a cylinder cutoff mode where at least one cylinder is cut off by shifting the intake and exhaust valves to their valve shutoff states, one of the two necessary conditions being a low load condition, and the other being a condition that an intake valve closure timing, varied by the intake-valve operating control mechanism, is controlled to a given timing value before a bottom dead center of a piston;
        (c) a fuel cutoff circuit that executes a fuel cutoff mode prior to the cylinder cutoff mode; and
        (d) an exhaust-valve shutdown circuit that reduces the valve lift amount of the exhaust valve included in the first group to the zero lift by the exhaust-valve operating control mechanism, depending on the valve lift amount of the intake valve included in the first group.

2. The cylinder cutoff control apparatus as claimed in claim 1, wherein:
    the low load condition is an engine operating condition that an engine speed is kept constant or decreasing.

3. The cylinder cutoff control apparatus as claimed in claim 1, wherein:
    the exhaust-valve shutdown circuit reduces the valve lift amount of the exhaust valve to the zero lift by the exhaust-valve operating control mechanism, after a reduction in the valve lift amount of the intake valve has been initiated by the intake-valve operating control mechanism or the valve lift amount of the intake valve has been reduced to the zero lift by the intake-valve operating control mechanism.

4. The cylinder cutoff control apparatus as claimed in claim 1, wherein:
    the exhaust-valve operating control mechanism variably adjusts the valve lift amount of the exhaust valve in a stepwise manner.

5. The cylinder cutoff control apparatus as claimed in claim 1, wherein:
    the intake-valve operating control mechanism comprises a continuously variable valve event and lift control mechanism including a drive shaft adapted to be driven by an engine crankshaft and having a drive cam fixedly connected to an outer periphery of the drive shaft, a rockable cam in cam-connection with the intake valve, a motion converter having a motion-conversion linkage and converting a rotary motion of the drive cam into an oscillating force of the motion-conversion linkage for transmitting a valve opening force to the intake valve, an attitude control mechanism having at least a control shaft and a control cam fixedly connected to the control shaft for varying an attitude of the motion-conversion linkage by a rotary motion of the control cam, and an actuator creating the rotary motion of the control cam responsively to a control signal from the intake-air quantity control circuit.

6. The cylinder cutoff control apparatus as claimed in claim 5, wherein:
    the motion converter comprises a rocker arm, which has a first armed portion and a second armed portion, and whose oscillating motion is created via a fulcrum by the oscillating force transmitted from the drive cam to the first armed portion of the rocker arm, the rocker arm creating an up-and-down motion of the intake valve by creating an oscillating motion of the rockable cam by the oscillating force transmitted via the second armed portion of the rocker arm to the rockable cam.

7. The cylinder cutoff control apparatus as claimed in claim 6, wherein:
    the control cam serves as the fulcrum of oscillating motion of the rocker arm, and the fulcrum of oscillating motion of the rocker arm is changed by the rotary motion of the control cam.

8. The cylinder cutoff control apparatus as claimed in claim 7, wherein:
    the motion converter further comprises a link arm rotatably connected to the first armed portion of the rocker arm and having a drive-cam retaining bore to which the drive cam is rotatably fitted.

9. The cylinder cutoff control apparatus as claimed in claim 7, wherein:
    the motion converter further comprises a link rod rotatably connected to the second armed portion of the rocker arm and mechanically linked to the rockable cam.

10. The cylinder cutoff control apparatus as claimed in claim 7, wherein:
    the rockable cam is oscillatingly supported on an outer periphery of the drive shaft.

11. The cylinder cutoff control apparatus as claimed in claim 5, further comprising:
    an angular position sensor that detects an angular position of the control shaft, wherein the valve lift amount of the intake valve is estimated based on a sensor signal value from the angular position sensor.

12. The cylinder cutoff control apparatus as claimed in claim 1, wherein:
the exhaust-valve operating control mechanism comprises an exhaust-valve camshaft adapted to be driven by an engine crankshaft;
a first exhaust cam and a second exhaust cam fixed to the exhaust-valve camshaft for co-rotation with the exhaust-valve camshaft, the second exhaust cam having a cam stroke higher than the first exhaust cam;
a first driving member having an armed portion whose tip is in abutted-engagement with a valve stem of the exhaust valve and a cam-follower portion in cam-connection with the first exhaust cam;
a second driving member located at a position corresponding to the second exhaust cam and operated in a lost-motion operating mode depending on the engine-and-vehicle operating condition, the second driving member being coupled with the first driving member for synchronous motion with the first driving member and uncoupled from the first driving member for executing the lost-motion operating mode of the second driving member; and
a coupling mechanism that selectively couples or uncouples the second driving member with or from the first driving member responsively to a control signal from the exhaust-valve shutdown circuit.

13. The cylinder cutoff control apparatus as claimed in claim 12, wherein:
the coupling mechanism comprises a hydraulically-operated coupling mechanism.

14. The cylinder cutoff control apparatus as claimed in claim 1, further comprising:
an intake-valve phase control mechanism capable of changing an intake valve open timing and the intake valve closure timing of the intake valve, the intake-valve phase control mechanism executing a phase control that the intake valve open timing is held at a given timing value substantially corresponding to a top dead center of the piston, simultaneously with adjusting the intake-valve lift and valve open period characteristic by the intake-valve operating control mechanism.

15. A cylinder cutoff control apparatus of an internal combustion engine comprising:
an intake-valve operating control mechanism capable of continuously reducing an intake-valve lift and valve open period characteristic of an intake valve to a zero lift and lifted-period characteristic;
an exhaust-valve operating control mechanism capable of continuously reducing an exhaust-valve lift and valve open period characteristic of an exhaust valve to a zero lift and lifted-period characteristic;
an engine-and-vehicle sensor that detects an engine-and-vehicle operating condition; and
a control unit configured to be electronically connected to at least the engine-and-vehicle sensor and the valve operating control mechanisms for controlling the valve operating control mechanisms depending on the engine-and-vehicle operating condition; the control unit comprising
(a) a cylinder cutoff circuit that generates control signals to the respective valve operating control mechanisms for reducing the valve lift amount of the exhaust valve substantially in proportion to a reduction in the valve lift amount of the intake valve, when executing, based on the engine-and-vehicle operating condition, a cylinder cutoff mode where at least one cylinder is cut off by shifting the intake and exhaust valves to their valve shutoff states; and
(b) a fuel cutoff circuit that initiates a fuel cutoff mode prior to the cylinder cutoff mode.

16. The cylinder cutoff control apparatus as claimed in claim 15, wherein:
during a transition from the fuel cutoff mode to the cylinder cutoff mode, the valve lift amount of the exhaust valve is reduced according to the reduction in the valve lift amount of the intake valve, while keeping an intake-valve open stroke obtained during a valve open period of the intake valve at a value substantially identical to an exhaust-valve open stroke obtained during a valve open period of the exhaust valve.

17. A cylinder cutoff control apparatus of an internal combustion engine comprising:
an intake-valve operating control mechanism capable of continuously reducing an intake-valve lift and valve open period characteristic of an intake valve to a zero lift and lifted-period characteristic;
an exhaust-valve operating control mechanism capable of continuously reducing an exhaust-valve lift and valve open period characteristic of an exhaust valve to a zero lift and lifted-period characteristic;
an engine-and-vehicle sensor that detects an engine-and-vehicle operating condition; and
a control unit configured to be electronically connected to at least the engine-and-vehicle sensor and the valve operating control mechanisms for controlling the valve operating control mechanisms depending on the engine-and-vehicle operating condition; the control unit comprising
(a) a cylinder cutoff circuit that generates control signals to the respective valve operating control mechanisms for reducing the valve lift amounts of the intake and exhaust valves synchronously with each other, when executing, based on the engine-and-vehicle operating condition, a cylinder cutoff mode where at least one cylinder is cut off by shifting the intake and exhaust valves to their valve shutoff states; and
(b) a fuel cutoff circuit that initiates a fuel cutoff mode prior to the cylinder cutoff mode.

18. A cylinder cutoff control apparatus of an internal combustion engine comprising:
an intake-valve operating control mechanism capable of continuously reducing an intake-valve lift and valve open period characteristic of an intake valve to a zero lift and lifted-period characteristic;
an exhaust-valve operating control mechanism capable of continuously reducing an exhaust-valve lift and valve open period characteristic of an exhaust valve to a zero lift and lifted-period characteristic;
an engine-and-vehicle sensor that detects an engine-and-vehicle operating condition; and
a control unit configured to be electronically connected to at least the engine-and-vehicle sensor and the valve operating control mechanisms for controlling the valve operating control mechanisms depending on the engine-and-vehicle operating condition; the control unit comprising
(a) a cylinder cutoff circuit that generates control signals to the respective valve operating control mechanisms for preferentially shifting a first one of the intake and exhaust valves to a valve shutdown state immediately when the valve lift amount of the second valve reduces to a predetermined value substantially corresponding to the zero lift, while reducing the valve lift amounts of the intake and exhaust valves synchronously with each other, when executing, based on the engine-and-vehicle operating condition, a cylinder cutoff mode where at least one cylinder is cut off by shifting the intake and exhaust valves to their valve shutoff states; and (b) a fuel cutoff circuit that initiates a fuel cutoff mode prior to the cylinder cutoff mode.

19. The cylinder cutoff control apparatus as claimed in claim 18, further comprising:

an intake-valve phase control mechanism capable of changing an intake valve open timing and an intake valve closure timing of the intake valve, the intake-valve phase control mechanism executing a phase control that the intake valve open timing is held at a given timing value. substantially corresponding to a top dead center of a piston, simultaneously with adjusting the intake-valve lift and valve open period characteristic by the intake-valve operating control mechanism.

20. The cylinder cutoff control apparatus as claimed in claim 18, further comprising:

an exhaust-valve phase control mechanism capable of changing an exhaust valve open timing and an exhaust valve closure timing of the exhaust valve, the exhaust-valve phase control mechanism executing a phase control that the exhaust valve closure timing is held at a given timing value substantially corresponding to a top dead center of a piston, simultaneously with adjusting the exhaust-valve lift and valve open period characteristic by the exhaust-valve operating control mechanism.

21. A cylinder cutoff control apparatus of an internal combustion engine comprising:

an intake-valve operating control mechanism capable of reducing an intake-valve lift and valve open period characteristic of an intake valve to a zero lift and lifted-period characteristic;

an exhaust-valve operating control mechanism capable of reducing an exhaust-valve lift and valve open period characteristic of an exhaust valve to a zero lift and lifted-period characteristic;

an engine-and-vehicle sensor that detects an engine-and-vehicle operating condition; and a control unit configured to be electronically connected to at least the engine-and-vehicle sensor and the valve operating control mechanisms for controlling the valve operating control mechanisms depending on the engine-and-vehicle operating condition; the control unit comprising (a) a cylinder cutoff circuit that executes, based on the engine-and-vehicle operating condition, a cylinder cutoff mode where a first group of cylinders are cut off by shifting the intake and exhaust valves included in the first group to their valve shutoff states and a second group of cylinders are working;

(b) a fuel cutoff circuit that initiates a fuel cutoff mode prior to the cylinder cutoff mode; and (c) an engine-torque compensation circuit that compensates for an engine-braking torque by controlling the valve lift amount of each of the intake valves included in the second group of working cylinders.

22. A cylinder cutoff control apparatus of an internal combustion engine comprising:

an intake-valve operating control mechanism capable of reducing an intake-valve lift and valve open period characteristic of an intake valve to a zero lift and lifted-period characteristic;

an exhaust-valve operating control mechanism capable of reducing an exhaust-valve lift characteristic of an exhaust valve to a zero lift characteristic;

an engine-and-vehicle sensor that detects an engine-and-vehicle operating condition; and a control unit configured to be electronically connected to at least the engine-and-vehicle sensor and the valve operating control mechanisms for controlling the valve operating control mechanisms depending on the engine-and-vehicle operating condition; the control unit comprising (a) a cylinder cutoff circuit that executes, based on the engine-and-vehicle operating condition, a cylinder cutoff mode where at least one cylinder is cut off by shifting the intake and exhaust valves to their valve shutoff states;

(b) a fuel cutoff circuit that initiates a fuel cutoff mode prior to the cylinder cutoff mode; and (c) a braking-torque compensation circuit that compensates for a fall in engine-braking torque by braking torque application during cylinder cutoff control.

23. The cylinder cutoff control apparatus as claimed in claim 22, wherein the cylinder cutoff mode is executed under a low load condition that an engine speed is kept constant or decreasing.

24. The cylinder cutoff control apparatus as claimed in claim 22, wherein the exhaust-valve operating control mechanism comprises:

an exhaust-valve camshaft adapted to be driven by an engine crankshaft;

a first exhaust cam and a second exhaust cam fixed to the exhaust-valve camshaft for co-rotation with the exhaust-valve camshaft, the second exhaust cam having a cam stroke higher than the first exhaust cam;

a first driving member having an armed portion whose tip is in abutted-engagement with a valve stem of the exhaust valve and a cam-follower portion in cam-connection with the first exhaust cam;

a second driving member located at a position corresponding to the second exhaust cam and operated in a lost-motion operating mode depending on the engine-and-vehicle operating condition, the second driving member being coupled with the first driving member for synchronous motion with the first driving member and uncoupled from the first driving member for executing the lost-motion operating mode of the second driving member; and a coupling mechanism that selectivity couples or uncouples the second driving member with or from the first driving member responsive to a control signal from the exhaust-valve shutdown circuit.

25. The cylinder cutoff control apparatus as claimed in claim 24, wherein the coupling mechanism comprises a hydraulically-operated coupling mechanism.

26. The cylinder cutoff control apparatus as claimed in claim 22, further comprising an intake-valve phase control mechanism capable of changing an intake valve open timing and the intake valve closure timing of the intake valve, the intake-valve phase control mechanism executing a phase control that the intake valve open timing is held at a given timing valve substantially corresponding to a top dead center of the piston, simultaneously with adjusting the intake-valve lift and valve open period characteristic by the intake-valve operating control mechanism.

27. The cylinder cutoff control apparatus as claimed in claim 22, wherein:
the cylinder cutoff circuit executes, based on the engine-and-vehicle operating condition, the cylinder cutoff mode where a first group of cylinders are cut off by shifting the intake and exhaust valves included in the first group to their valve shutoff states and a second group of cylinders are working; and
wherein the braking-torque compensation circuit compensates for the engine-braking torque by controlling the valve lift amount of each of the intake valves included in the second group of working cylinders.

28. The cylinder cutoff control apparatus as claimed in claim 22, wherein the cylinder cutoff circuit comprises an exhaust-valve shutdown circuit that reduces the valve lift amount of the exhaust valve included in the first group to the zero lift by the exhaust-valve operating control mechanism, depending on the valve lift amount of the intake valve included in the first group.

29. A cylinder cutoff control apparatus of an internal combustion engine comprising:
an intake-valve operating control mechanism capable of reducing an intake-valve lift and valve open period characteristic of an intake valve to a zero lift and lifted-period characteristic;
an exhaust-valve operating control mechanism capable of reducing an exhaust-valve lift and valve open period characteristic of an exhaust valve to a zero lift and lifted-period characteristic;
an electronically-controlled throttle that adjusts a throttle opening amount;
an engine-and-vehicle sensor that detects an engine-and-vehicle operating condition; and
a control unit configured to be electronically connected to at least the electronically-controlled throttle, the engine-and-vehicle sensor, and the valve operating control mechanisms for controlling the electronically-controlled throttle and the valve operating control mechanisms depending on the engine-and-vehicle operating condition; the control unit comprising a processor programmed to perform the following,
(a) controlling a quantity of intake air by the intake-valve operating control mechanism rather than throttle opening control executed by the electronically-controlled throttle;
(b) executing, under a low load condition that an engine speed is kept constant or decreasing, a cylinder cutoff mode where at least one cylinder is cut off by shifting the intake and exhaust valves to their valve shutoff states;
(c) executing a fuel cutoff mode prior to the cylinder cutoff mode;
(d) setting, under the low load condition, an intake valve closure timing of the intake valve to a given timing value before a bottom dead center of a piston by the intake-valve operating control mechanism; and
(e) reducing the valve lift amounts of the intake and exhaust valves toward the zero lifts by the valve operating control mechanisms, while keeping the throttle opening amount at a value substantially corresponding to a substantially fully-opened position of the electronically-controlled throttle, during a transition from the fuel cutoff mode to the cylinder cutoff mode.

30. The cylinder cutoff control apparatus as claimed in claim 29, wherein:
the low load condition is an engine operating condition that an engine speed is kept constant or decreasing.

31. The cylinder cutoff control apparatus as claimed in claim 29, wherein:
during the transition from the fuel cutoff mode to the cylinder cutoff mode, the valve lift amount of the exhaust valve is reduced to the zero lift by the exhaust-valve operating control mechanism, depending on the valve lift amount of the intake valve.

32. The cylinder cutoff control apparatus as claimed in claim 29, further comprising:
an intake-valve phase control mechanism capable of changing an intake valve open timing and the intake valve closure timing of the intake valve,
wherein said processor is further programmed for,
(f) executing a phase control that the intake valve open timing is held at a given timing value substantially corresponding to a top dead center of the piston by the intake-valve phase control mechanism, simultaneously with adjusting the intake-valve lift and valve open period characteristic by the intake-valve operating control mechanism.

33. The cylinder cutoff control apparatus as claimed in claim 29, wherein:
during the transition from the fuel cutoff mode to the cylinder cutoff mode, the valve lift amount of the intake valve and the valve lift amount of the exhaust valve are reduced synchronously with each other.

34. The cylinder cutoff control apparatus as claimed in claim 29, wherein:
during the transition from the fuel cutoff mode to the cylinder cutoff mode, the valve lift amount of the intake valve and the valve lift amount of the exhaust valve are reduced synchronously with each other, while keeping an intake-valve open stroke obtained during a valve open period of the intake valve at a value substantially identical to an exhaust-valve open stroke obtained during a valve open period of the exhaust valve.

35. The cylinder cutoff control apparatus as claimed in claim 34, wherein:
during the transition from the fuel cutoff mode to the cylinder cutoff mode, a first one of the intake and exhaust valves of each individual cylinder to a valve shutdown state immediately when the valve lift amount of the second valve reduces to a predetermined value substantially corresponding to the zero lift, while reducing the valve lift amounts of the intake and exhaust valves synchronously with each other.

36. The cylinder cutoff control apparatus as claimed in claim 29, wherein said processor is further programmed for:
(g) compensating for an engine-braking torque by controlling the valve lift amount of each of the intake valves.

37. The cylinder cutoff control apparatus as claimed in claim 29, wherein said processor is further programmed for:
(h) compensating for a fall in engine-braking torque by braking torque application during cylinder cutoff control.

* * * * *